(12) United States Patent
Ackerman

(10) Patent No.: US 10,742,789 B2
(45) Date of Patent: Aug. 11, 2020

(54) MOBILE DEVICE CASES, MOBILE DEVICE ASSEMBLIES, AND RELATED ACCESSORIES

(71) Applicant: Lifeworks Technology Group LLC, New York, NY (US)

(72) Inventor: Omer Ackerman, New York, NY (US)

(73) Assignee: Lifeworks Technology Group LLC, New York, NY (US)

( * ) Notice: Subject to any disclaimer, the term of this patent is extended or adjusted under 35 U.S.C. 154(b) by 0 days.

(21) Appl. No.: 16/117,828

(22) Filed: Aug. 30, 2018

(65) Prior Publication Data

US 2020/0076937 A1 Mar. 5, 2020

(51) Int. Cl.
*H04M 1/02* (2006.01)
*H04M 1/21* (2006.01)
*H04B 1/3888* (2015.01)

(52) U.S. Cl.
CPC ............ *H04M 1/21* (2013.01); *H04B 1/3888* (2013.01)

(58) Field of Classification Search
CPC combination set(s) only.
See application file for complete search history.

(56) References Cited

U.S. PATENT DOCUMENTS

| | | | |
|---|---|---|---|
| 5,604,958 A | 2/1997 | Anscher | |
| 5,833,100 A * | 11/1998 | Kim | A45F 5/02 224/197 |
| D619,130 S | 7/2010 | Fellig | |
| D654,931 S | 2/2012 | Lemelman et al. | |
| D688,655 S | 8/2013 | Rey-Hipolito et al. | |
| 8,584,916 B1 | 11/2013 | Chen | |
| 9,185,953 B2 | 11/2015 | Whitten et al. | |
| D744,470 S | 12/2015 | Stevinson | |
| 9,271,561 B2 | 3/2016 | Chang | |
| 9,314,092 B2 | 4/2016 | Wang et al. | |
| 2008/0237282 A1* | 10/2008 | Sin | A45F 5/02 224/197 |
| 2009/0084705 A1* | 4/2009 | Justiss | A45F 5/02 206/724 |
| 2014/0057687 A1* | 2/2014 | Yoo | H04B 1/3888 455/575.8 |
| 2014/0228082 A1* | 8/2014 | Morrow | H04B 1/3888 455/575.8 |
| 2015/0182009 A1 | 7/2015 | Whang et al. | |
| 2016/0294201 A1* | 10/2016 | Hamama | H02J 7/0044 |
| 2017/0197004 A1* | 7/2017 | Kim | A61L 9/035 |

\* cited by examiner

*Primary Examiner* — Charles N Appiah
*Assistant Examiner* — Xiang Zhang
(74) *Attorney, Agent, or Firm* — Wood Herron & Evans LLP

(57) ABSTRACT

A mobile device case for receiving a mobile device. An inner wall defines an opening in a base side. The base side includes at least one recess that includes a stop. The opening receives a male portion of a male-female connection. The stop is positioned to prevent 180 degrees of relative rotation between the mobile device case and the male portion. The mobile device case and an accessory form an assembly. When the male-female connection is formed, the mobile device case and the accessory are coupled together. In one embodiment, the stop is configured to contact the male portion in one rotational direction so that to decouple the mobile device case and the accessory, relative rotation is reversed. The opening may be an oval.

20 Claims, 42 Drawing Sheets

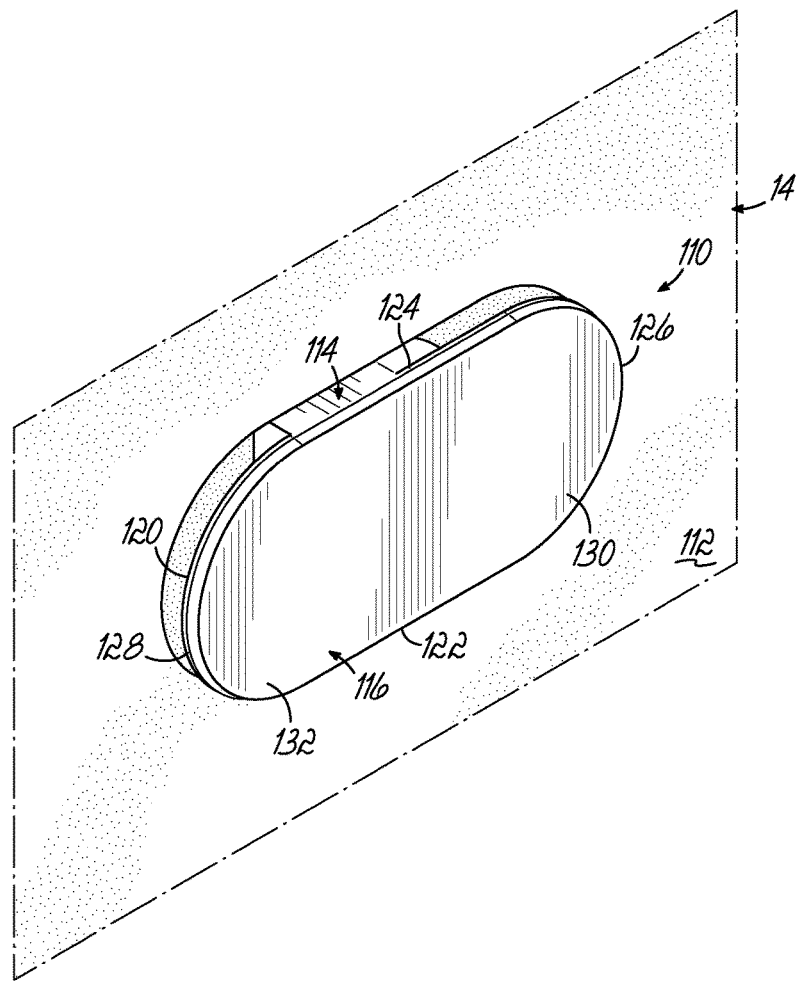
FIG. 11
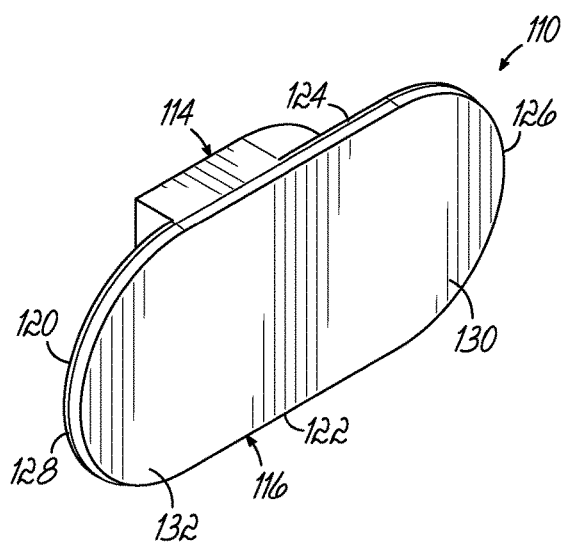 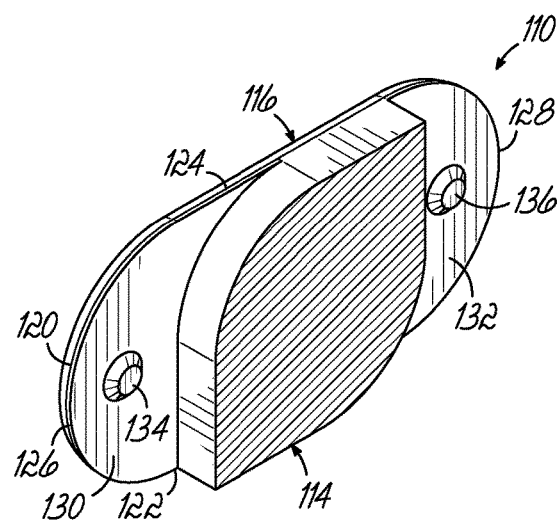
FIG. 12  FIG. 13

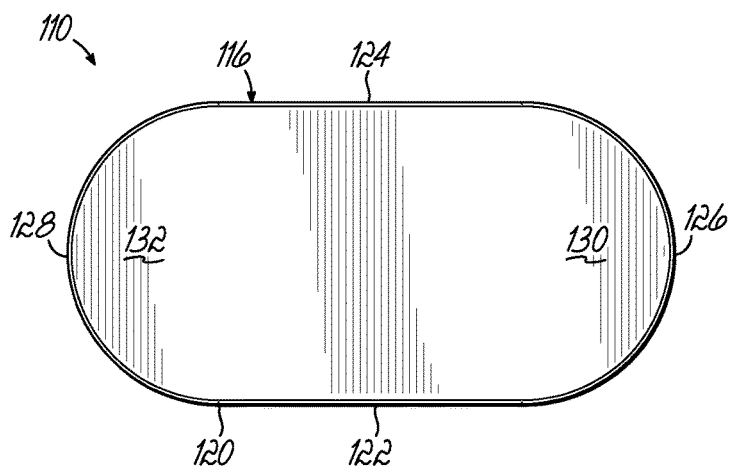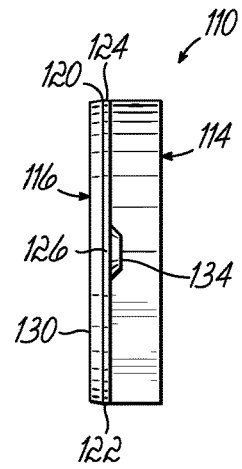
FIG. 14　　　　　　　FIG. 16
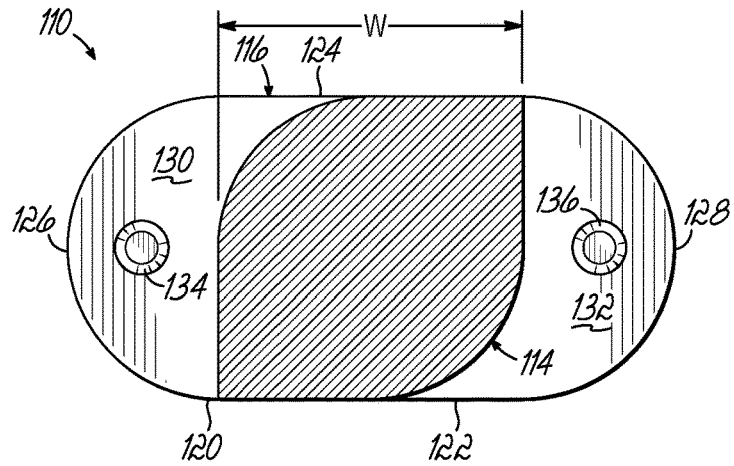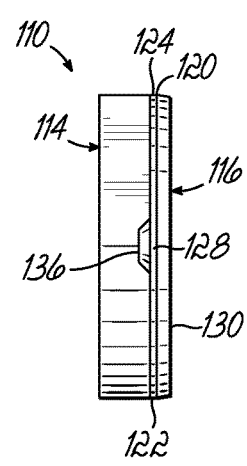
FIG. 15　　　　　　　FIG. 17
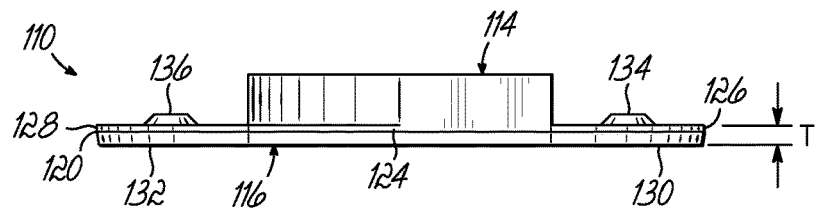
FIG. 18
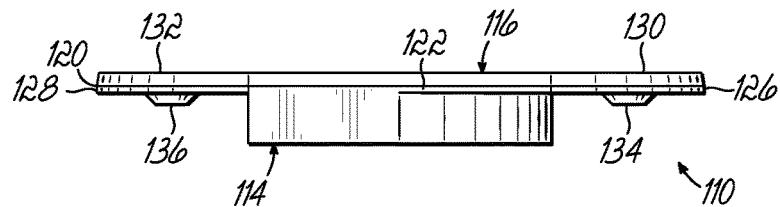
FIG. 19

MOBILE DEVICE CASES, MOBILE DEVICE ASSEMBLIES, AND RELATED ACCESSORIES

TECHNICAL FIELD

The present invention relates generally to mobile device cases and, more particularly, to cellular phones cases, case assemblies, and related accessories for those cases.

BACKGROUND

Mobile devices, such as smartphones, are seemingly essential to everyday life. Many people routinely carry their phone in their pocket or purse. Other items are also carried in these same locations and so are in contact with the phone. These items include photo identification, security access cards, and credit cards. Many people store their personal identification and other personal items in their pockets or in their purses so that they are readily accessible. Often people store these separate items in a wallet or in a similar personal storage accessory for convenience purposes.

It is desirable to maintain easy access to all these items, including a smart phone. However, storing a smart phone together with a wallet, for example, in the same location can cause problems. When a person retrieves their smartphone from their pocket, they may inadvertently pull their wallet out with their smartphone. As a result, the person may inadvertently lose their wallet. An equally disastrous result may occur if a person retrieves their wallet and their smart phone is inadvertently pulled from their pocket. In that case, the smart phone may be damaged or lost.

While cases have been commercially successful, embodiments of the present invention solve problems not identified with current case designs and so embodiments of the invention maintain and improve upon those case designs and accessories.

SUMMARY OF THE INVENTION

The present invention overcomes the foregoing and other shortcomings and drawbacks of phone cases heretofore known. While the invention will be described in connection with certain embodiments, it will be understood that the invention is not limited to these embodiments. On the contrary, the invention includes all alternatives, modifications and equivalents as may be included within the spirit and scope of the present invention.

In accordance with the principles of the present invention, a mobile device case is provided for receiving a mobile device. The mobile device case includes a base side and a side wall extending from the base side. The side wall defines an opening through which the mobile device is insertable into the mobile device case. An inner wall defines an opening in the base side, and the base side includes at least one recess that includes a stop. The opening is configured to receive a male portion of a male-female connection and the at least one recess is configured to rotationally receive the male portion after the male portion is inserted in the opening. The stop is positioned to prevent 180 degrees of relative rotation between the mobile device case and the male portion.

In one embodiment, the stop is configured to contact the male portion in one rotational direction to couple the mobile device case and the male portion, and to uncouple the mobile device case and the male portion, rotation is reversed.

In one embodiment, the stop is positioned to limit relative rotation between the mobile device case and the male portion to about 90°.

In one embodiment, the at least one recess includes a depression configured to receive a protrusion on the male portion.

In one embodiment, the opening is an oval.

In one embodiment, the at least one recess intersects the inner wall at an edge.

In one embodiment, the base side includes a raised region extending outwardly relative to a surrounding area of the base side. The raised region provides a planar surface that is spaced apart from the surrounding area of the base side.

In one embodiment, the mobile device case further includes a second recess that opposes the at least one recess opposite the opening, each recess being defined in part by a peripheral wall, and each peripheral wall intersecting the inner wall at at least one location and at each intersection an angle of about 90° is formed between the peripheral wall and the inner wall.

In one embodiment, the opening is oval, and each recess shares an edge with the inner wall.

In accordance with the principles of the present invention, a mobile device case assembly includes the mobile device case and an accessory having the male portion. The accessory may be a wallet or a battery.

In one embodiment, the male portion has a T-shape.

In one embodiment, the base side includes opposing recesses that each share an edge with the inner wall and the crossmember defines opposing wings that are configured to be received in the opposing recesses when the male portion is inserted into the opening and the accessory is rotated relative to the mobile device case.

In accordance with the principles of the present invention, a mobile device case is provided for receiving a mobile device. The mobile device case including a base side and a side wall extending from the base side and defining an opening through which the mobile device is insertable into the mobile device case. A male portion extends outwardly from the base side and includes a post and a crossmember that extends outwardly from one end of the post to form opposing wings that are spaced apart from the base side.

In one embodiment, the crossmember is oval.

In accordance with the principles of the present invention, a mobile device case and an accessory are provided that form an assembly. The assembly includes a mobile device case and an accessory. The assembly includes a male-female connection including an opening in one of the mobile device case and the accessory and a male portion in the other of the mobile device case and the accessory.

When the male-female connection is formed, the mobile device case and the accessory are coupled together. The male-female connection includes a stop and is formed by insertion of the male portion into the opening and rotating the male portion relative to the opening. Relative rotation between the male portion and the opening is limited to less than 180° by the stop.

In one embodiment, the stop is configured to contact the male portion in one rotational direction so that to decouple the mobile device case and the accessory, relative rotation is reversed.

In one embodiment, the stop is positioned to stop relative rotation between the mobile device case and the accessory at about 90°.

In one embodiment, the opening is an oval.

In one embodiment, the mobile device case includes a side wall extending from the base side and the base side includes an inner wall that defines the opening and at least one recess that intersects the inner wall at an edge, the at least one recess defines the stop.

BRIEF DESCRIPTION OF THE DRAWINGS

The accompanying drawings, which are incorporated in and constitute a part of this specification, illustrate embodiments of the invention and together with the detailed description given below, serve to explain various aspects of the invention.

FIGS. 11-19 are various views of a male portion of a male-female connection according to one embodiment of the invention.

DETAILED DESCRIPTION

Figure 1:
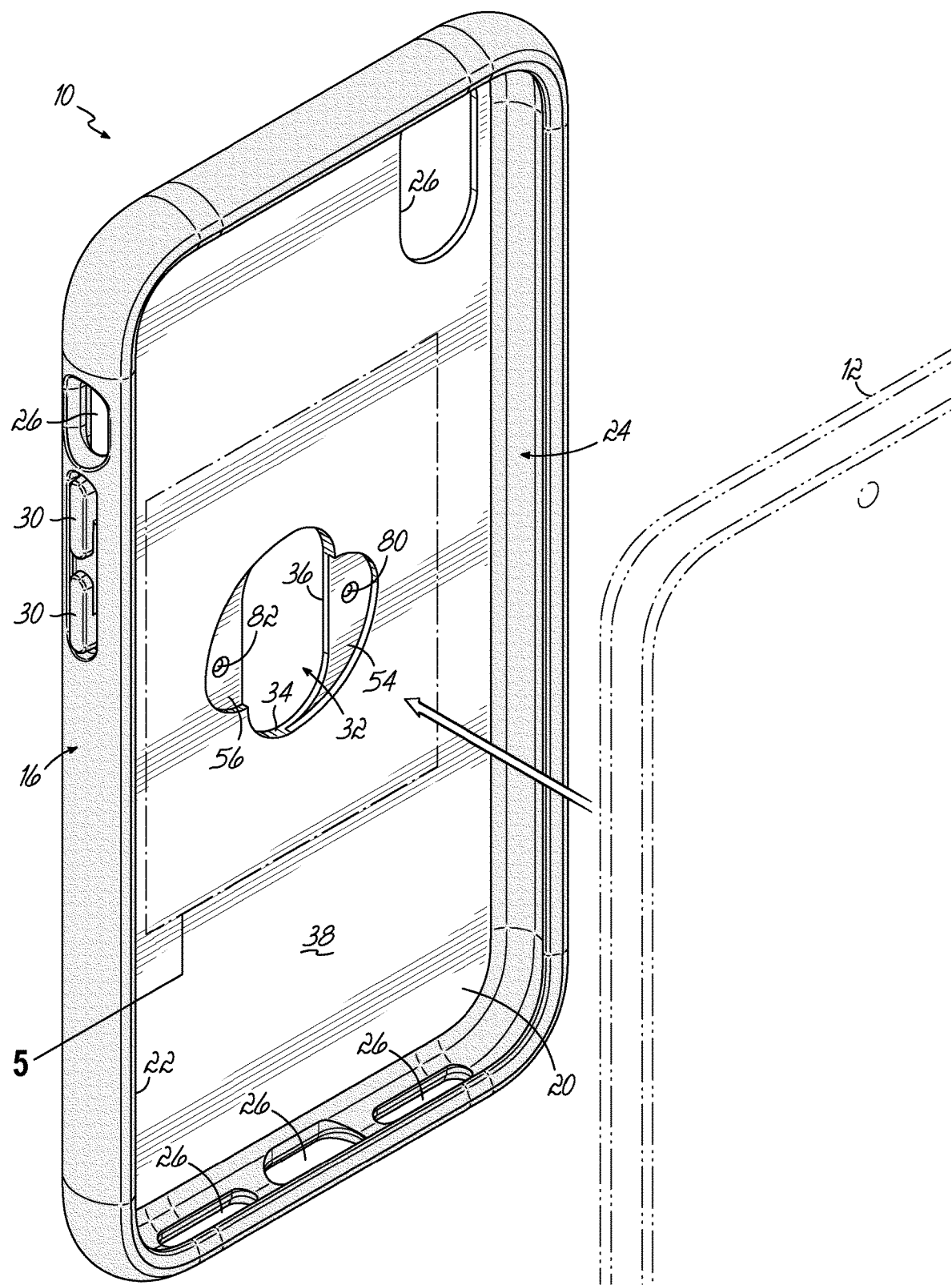
FIG. 1 is a front perspective view of a mobile device case according to one embodiment of the invention.

With reference to FIG. 1, an exemplary mobile device case 10 is shown. In the exemplary embodiment, the mobile device case 10 is configured to receive a mobile device 12, such as a smart phone manufactured by Apple or Samsung. The mobile device case 10 receives the mobile device 12 in an orientation in which a display of the mobile device 12 and the phone's accessories are operable when the mobile device 12 is inserted into the mobile device case 10. Although not shown, the mobile device case 10 may be configured to receive other mobile devices, such as tablets or other mobile personal computers. In addition to protecting the mobile device 12, the mobile device case 10 according to embodiments of the invention is configured to be coupled to accessories, such as a wallet 14 (shown in FIG. 10) via a male-female connection, described below. Once the accessory 14 is coupled to the mobile device case 10, the two may not be inadvertently separated from one another, though the mobile device case 10 and accessory 14 may be intentionally separated. Advantageously, the mobile device case 10 facilitates storage of the mobile device 12 and the accessory 14 while reducing the likelihood that one of the accessory 14 and the mobile device 12 is lost when the other is removed from a garment, such as a pocket. The mobile device 12 and the accessory 14 are moved together. Moreover, the accessory 14 may only be intentionally separated from the mobile device case 10 (and mobile device 12) by rotating the accessory 14 relative to the mobile device case 10 in a single predetermined direction to unlock the male-female connection so that a male portion of the male-female connection may be disengaged from a female portion of the male-female connection. Thus, in situations where it is more convenient for the accessory 14 or the mobile device 12 to be used separately from the other, the user may easily separate the two by an initial specific relative rotation followed by separating the male portion and female portion of the connection. The accessory 14 may then be used independently of the mobile device 12 and vice versa.

To these and other ends and with reference to FIGS. 1-4, the mobile device case 10 has a side wall 16 that extends from and surrounds a base side 20. As shown, the side wall 16 defines an opening 22, and the side wall 16 and the base side 20 enclose a rectangular shaped cavity 24 that removably receives the mobile device 12 through the opening 22. The shape defined by the side wall 16 and the base side 20 is not limited to the embodiments shown. Other shapes may be defined by the side wall 16 and the base side 20 depending upon the configuration of the mobile device 12.

As shown in FIG. 1, the mobile device case 10 may include a plurality of openings 26 that are configured to align with features on the mobile device 12, for example a camera, speakers, and a power port. The mobile device case 10 may also include responsive buttons 30 to adjust corresponding volume buttons on the mobile device 12. In addition to the openings 26, embodiments of the invention include an opening 32 in the base side 20. The opening 32 is a female portion or connector of the male-female connection for coupling the accessory 14 to the mobile device case 10.

Figure 2:
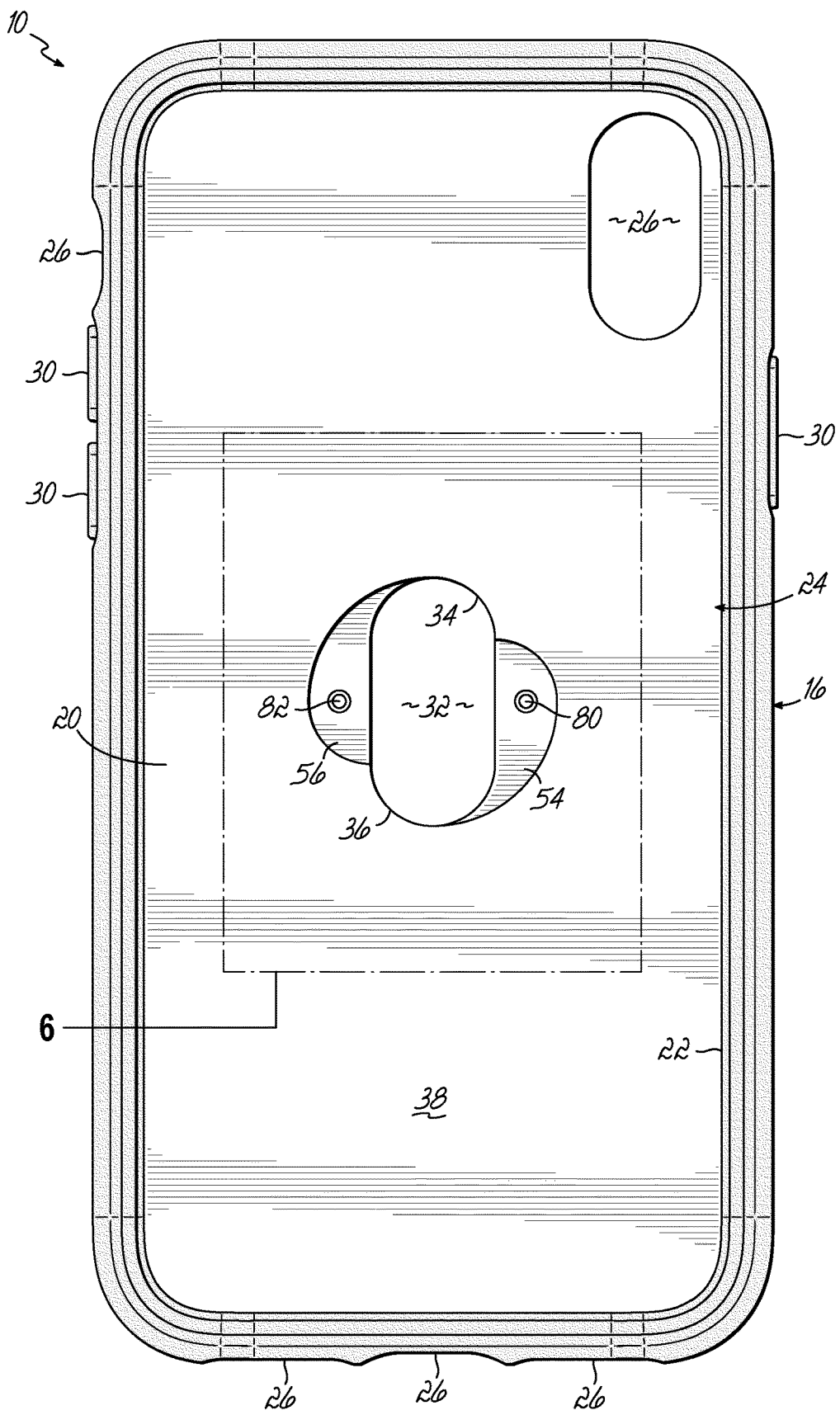
FIG. 2 is a front plan view of the device shown in FIG. 1.
Figure 3:
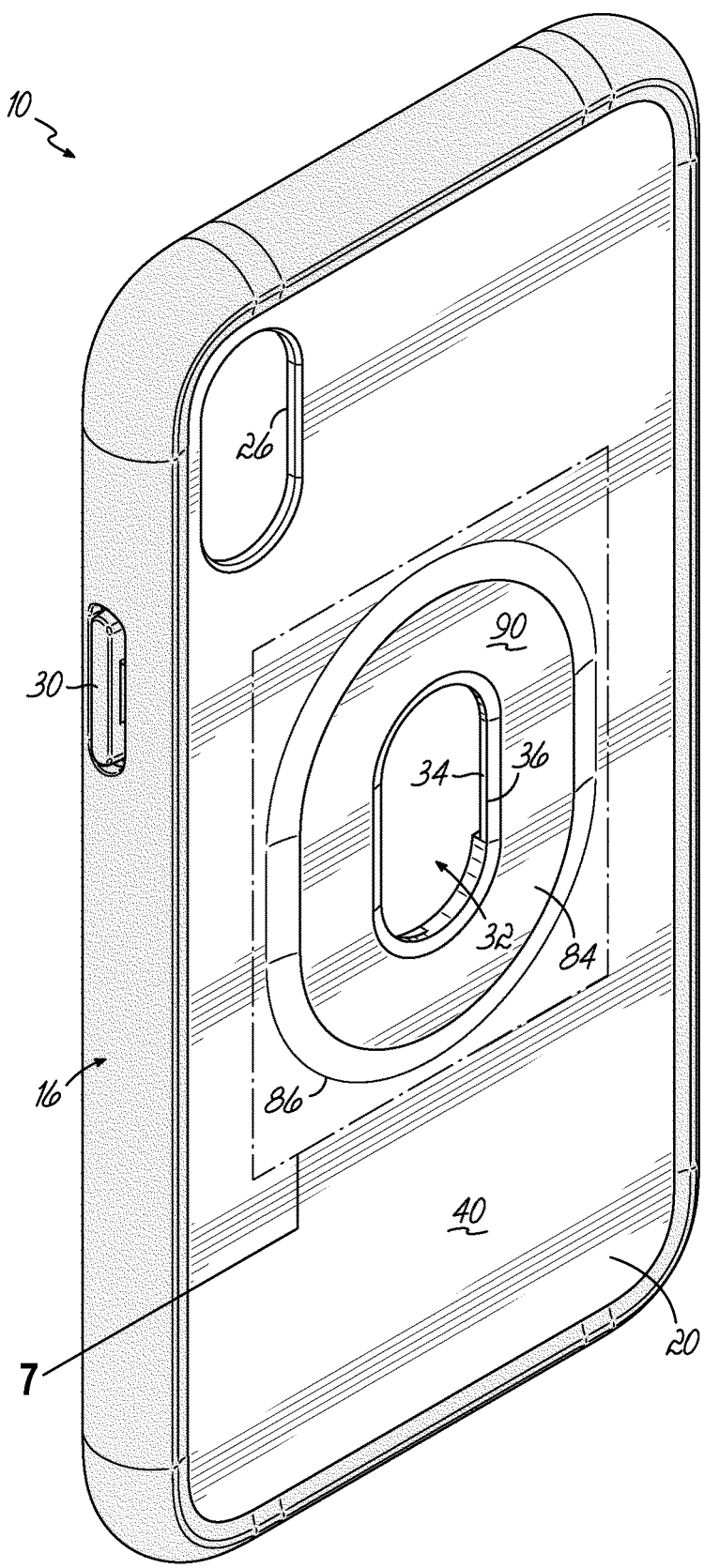
FIG. 3 is a rear perspective view of the mobile device case shown in FIG. 1.
Figure 4:
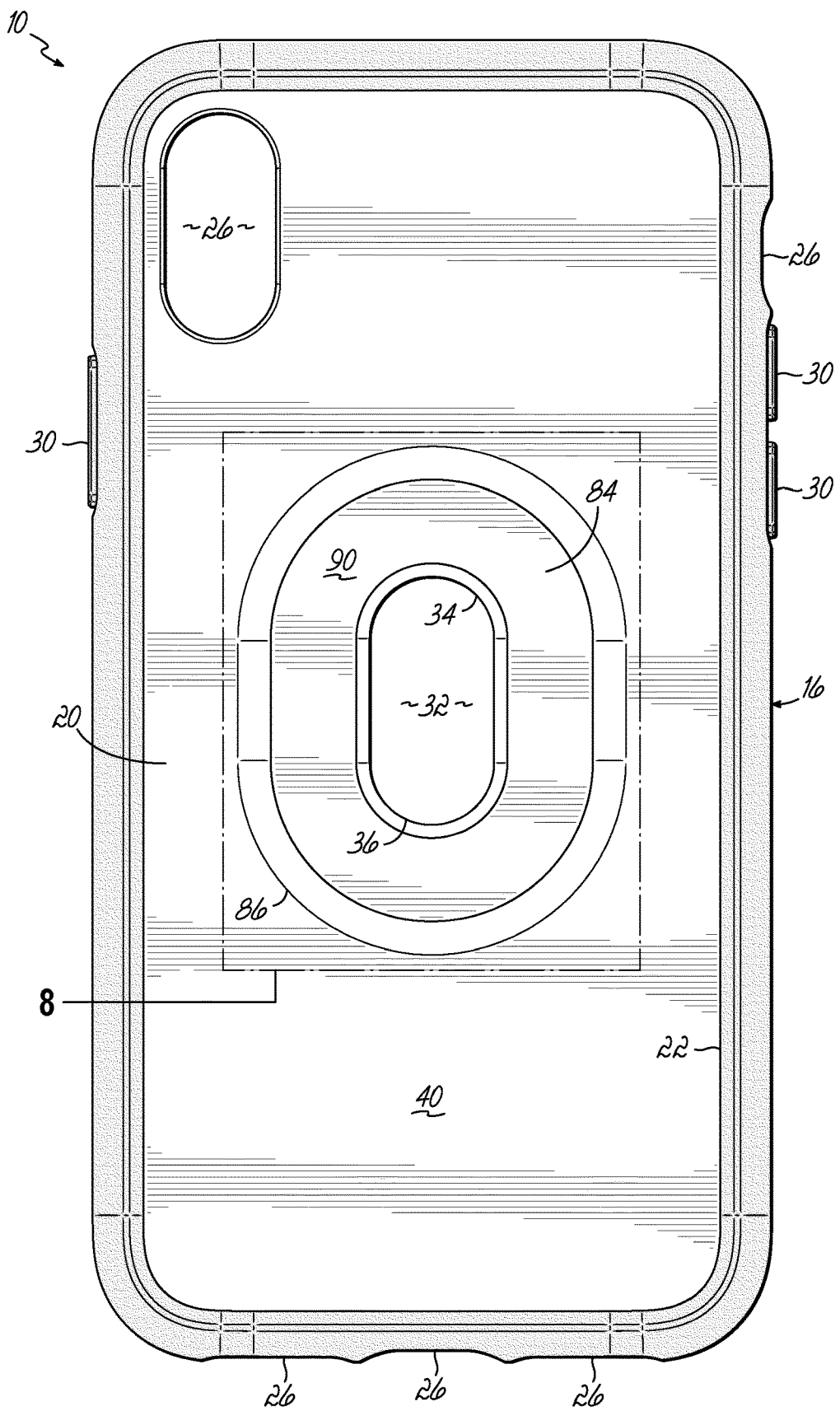
FIG. 4 is a rear plan view of the device shown in FIG. 3.

In this regard, the opening 32 is configured to receive a male portion or connector on the accessory 14. Rotational motion (described below in relation to FIGS. 20-27) between the mobile device case 10 and the accessory 14, that is, between the male connector and the female connector essentially locks the accessory 14 to the mobile device case 10, and thus to the mobile device 12, during use. Reverse rotational motion unlocks the accessory 14 from the mobile device case 10. As is generally shown in FIG. 2, the opening 32 may be centrally located in the base side 20. However, embodiments of the invention are not limited to the location of the opening 32 in the base side 20 shown in the figures. The location of the opening 32 in the base side 20 may depend on the type of accessory 14.

An exemplary embodiment of the opening 32 is shown in further detail in FIGS. 5-8 in which the opening 32 penetrates through the base side 20. In that regard, an inner wall 34 defines a periphery 36 of the opening 32. The periphery 36 has an oval configuration (i.e., a rectangular configuration having rounded corners). By way of example only, and not limitation, the periphery 36 includes opposing straight sides 42, 44 into opposing rounded ends 46, 48. While other configurations are possible, the periphery 36 does not define a circle, that is, the periphery 36 is noncircular. By way of example only, the periphery 36 may define a rectangle, a rectangle with slightly rounded corners, a trapezoid, an irregular stretched hexagon (i.e., two opposing sides are longer than the remaining sides, which are equal in length), or an irregular stretch octagon (i.e., two opposing sides are longer than the remaining sides, which are equal in length), to name only a few.

Figure 6:
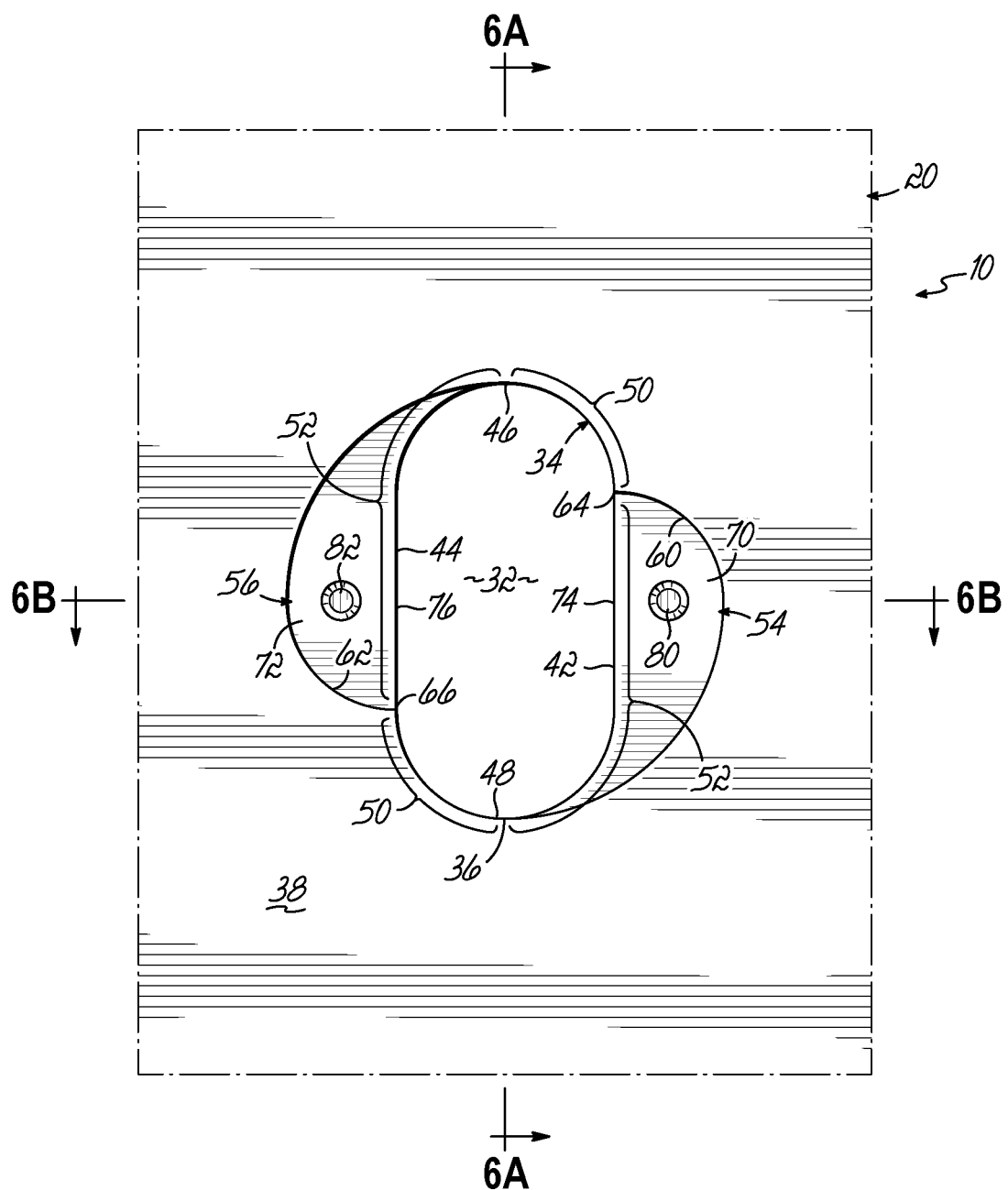
FIG. 6 is a plan view of FIG. 5.

The inner wall 34 extends from an inner surface 38 of the base side 20 to an outer surface 40 of the base side 20 along portions of the opening 32. Those portions are indicated at 50 (FIG. 6). At other locations, indicated at 52 (FIG. 6), along the periphery 36, the inner wall 34 extends only part way through the base side 20. At these other locations 52, opposing recesses 54, 56 are formed in the base side 20. Thus, the recesses 54, 56 are penetrations into the inner surface 38 that extend only part way through the base side 20. The recesses 54, 56 provide a void space or relief area between the mobile device 12 and the mobile device case 10, particularly between the mobile device 12 and the inner surface 38 of the base side 20. The recesses 54, 56 are configured to receive a portion of the male connector when the male-female connection is rotated to a locked position.

Figure 5:
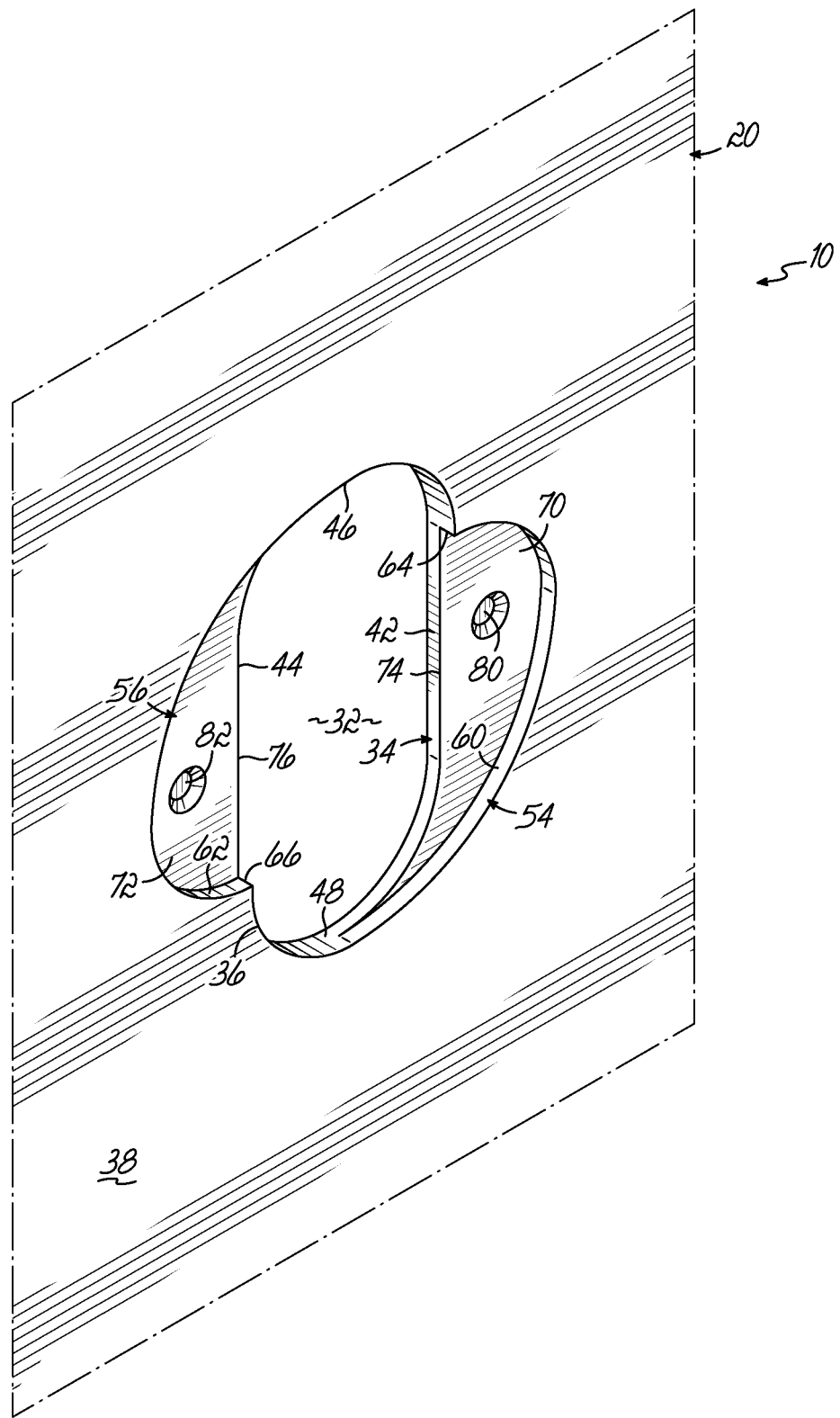
FIG. 5 is an enlarged view of the encircled area 5 shown in FIG. 1.

With reference to FIGS. 5 and 6, in one embodiment, the recess 54 is defined by a peripheral wall 60 that has an arcuate shape. The peripheral wall 60 may intersect the inner wall 34 at two locations. In other words, the peripheral wall 60 does not extend 360° around the opening 32 so as to surround it. Instead, for example, the peripheral wall 60 intersects the inner wall 34 at the rounded end 48, for example, at a midpoint of the rounded end 48. The peripheral wall 60 also intersects the straight side 42 at or near its intersection with the rounded end 48 at 64. The peripheral wall 60 may intersect the periphery 36 of the opening 32 at an angle of about 90°. The term "about" is used herein to denote 90° plus or minus manufacturing tolerances of a few degrees (e.g., ±2°). The peripheral wall 60 acts as a stop when the wallet 14 is rotationally coupled to the mobile device case 10. That is, a male portion of the wallet 14 (described below) rotationally engages the wall 60 and is prevented from further relative rotation in the same direction. The stop prevents relative rotation between the accessory 14 and the mobile device case 10 of 180°. Relative rotation between the mobile device case 10 and the wallet 14 may be limited to about 90° by the configuration of the wall 60, particularly at 64. The recess 56 has a similar configuration.

In that regard, the recess 56 is defined by a peripheral wall 62 that has a similar arcuate shape as that of the peripheral wall 60. The peripheral wall 62 may intersect the inner wall 34 at two locations. In other words, the peripheral wall 62 does not extend 360° around the opening 32 so as to surround it. Instead, for example, the peripheral wall 62 intersects the inner wall 34 at the rounded end 46, for example, at a midpoint of the rounded end 46. The peripheral wall 62 also intersects the straight side 44 at 66 or near the intersection of the straight side 44 with the rounded end 48. The peripheral wall 62 may be symmetric with the peripheral wall 60, though any symmetry between the peripheral wall 60 and the peripheral wall 62 is related to rotation around an axis perpendicular to a plane of figure. By way of example, rotation may be 180°. The peripheral wall 62 acts as a stop when the wallet 14 is rotationally coupled to the mobile device case 10. That is, a male portion of the wallet 14 (described below) rotationally engages the wall 62 and is prevented from further relative rotation. The stop prevents relative rotation between the accessory 14 and the mobile device case 10 of 180°. Relative rotation between the mobile device case 10 and the wallet 14 may be limited to about 90° by the configuration of the wall 62, particularly at 66. However, embodiments of the invention are not limited to 90° as rotational limitations between the accessory 14 and the mobile device case 10 may be limited to less than 180° and greater than a minimum (about 10°) relative rotation that permits the accessory 14 to be coupled via the male-female connection to the mobile device case 10.

Figure 6A:
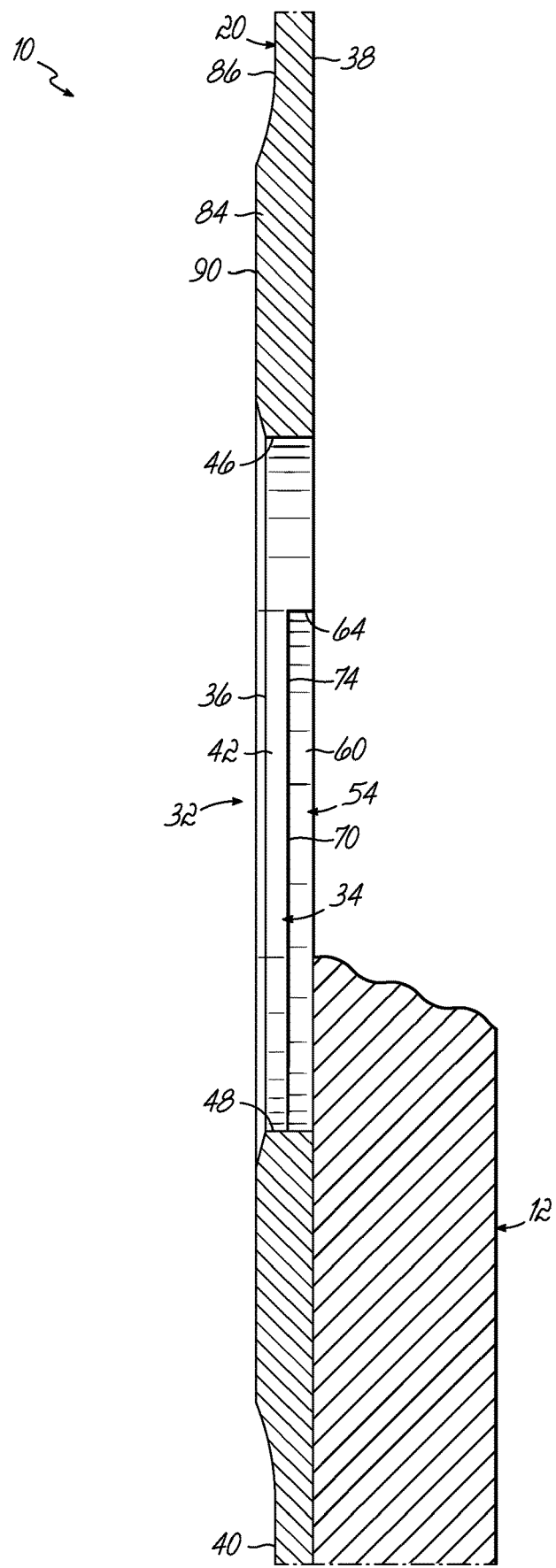
FIGS. 6A and 6B are cross-sections taken along section line 6A-6A and section line 6B-6B of FIG. 6, respectively.
Figure 6B:
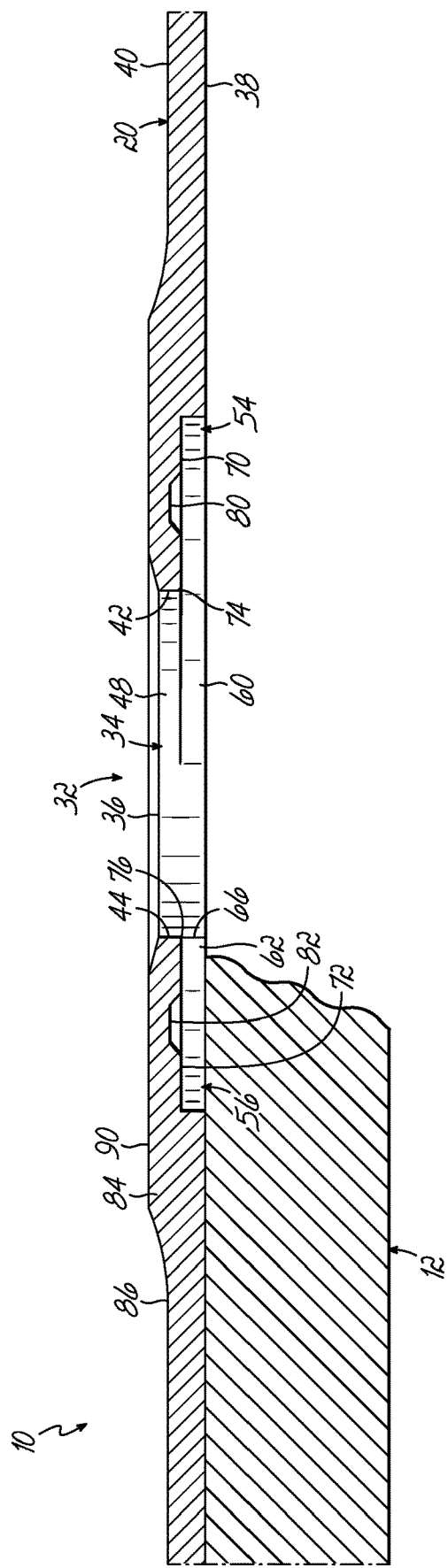
Figure 7:
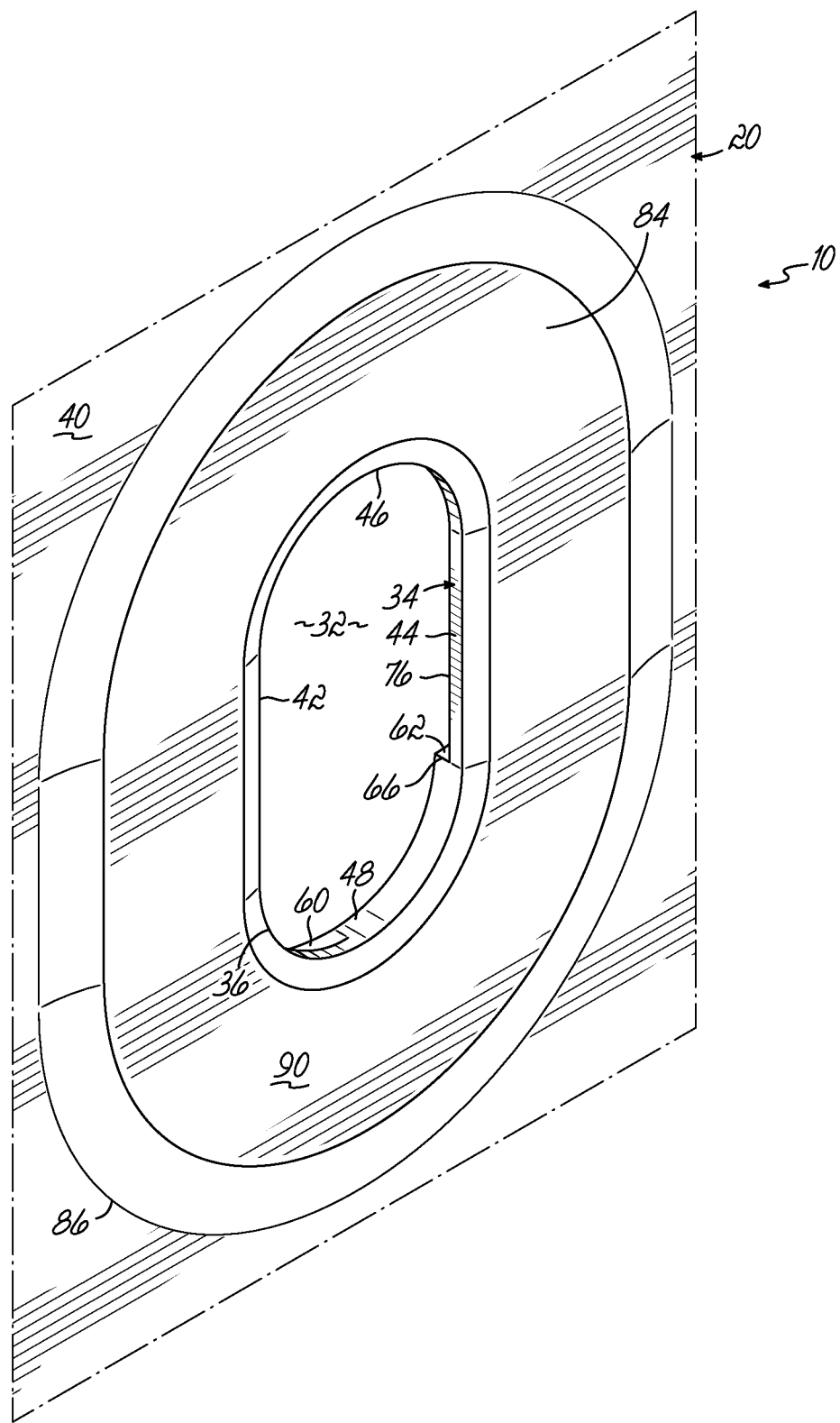
FIG. 7 is an enlarged view of the encircled area 7 shown in FIG. 3.
Figure 8:
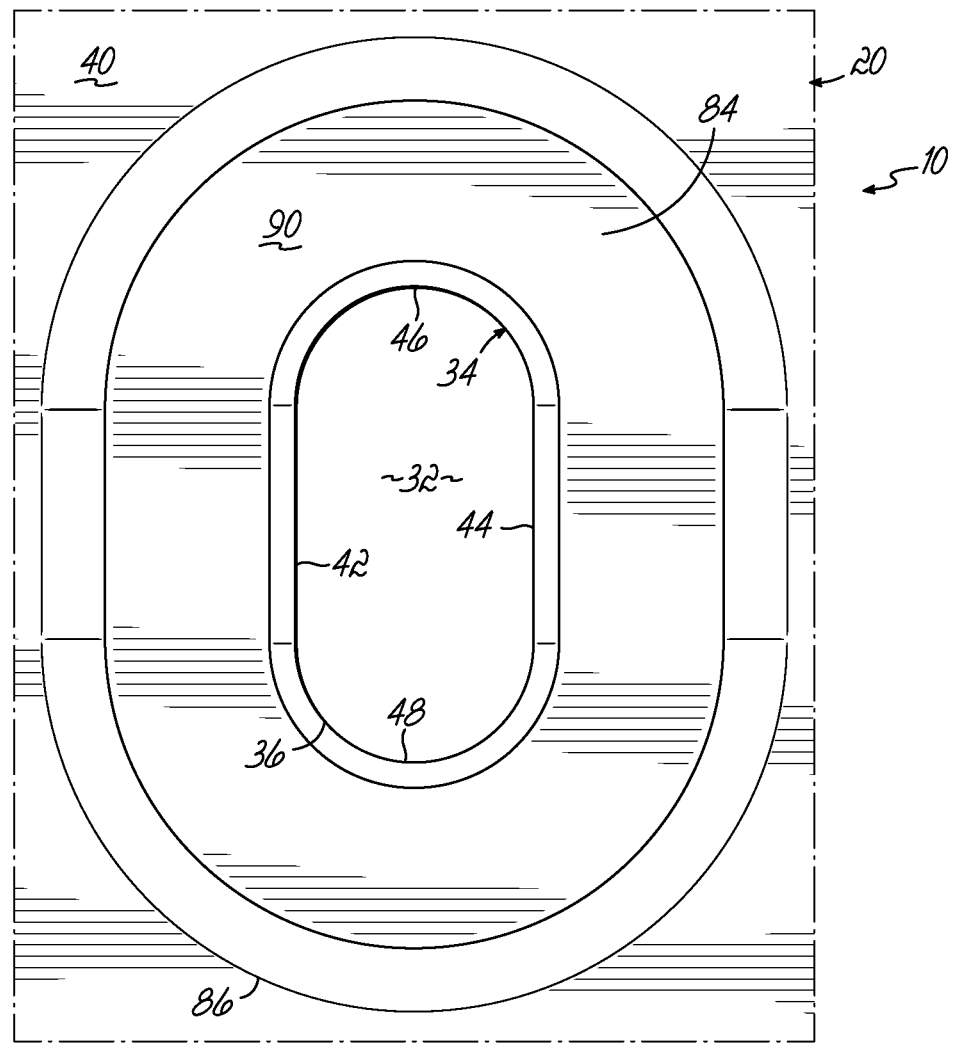
FIG. 8 is a plan view of FIG. 7.

The recesses 54, 56 may be further defined by recessed surfaces 70, 72, respectively, which lie in a plane between the inner surface 38 and the outer surface 40 of the base side 20. The recessed surfaces 70, 72 each intersect the inner wall 34 at edges 74, 76, respectively, shown best in FIGS. 6A and 6B. The recessed surfaces 70, 72 may include a depression 80, 82, each of which cooperates with a corresponding protrusion on the accessory 14 to arrest relative rotational motion between the mobile device case 10 and the accessory 14, as is described below. The combination of the depression 80, 82 and corresponding protrusion is not equivalent to a stop described above, as the depression/protrusion may only require a threshold level of torque to rotate the case 10 relative to the accessory 14 in either direction. The stop is a physical barrier to relative motion in one direction.

In one embodiment and with reference to FIGS. 6A, 6B, 7, and 8, the base side 20 may include a raised region 84 in which the opening 32 is positioned. The raised region 84 may be the result of an increase in thickness of the base side 20 in the area surrounding the opening 32. As shown the raised region 84 may have a periphery 86 that is generally shaped the same as the periphery 36 of the opening 32. The raised region 84 may provide a planar surface 90 that is spaced apart from a surrounding portion of the outer surface 40 of the base side 20. The planar surface 90 may taper to the outer surface 40 at the location of the periphery 86. As will be described below, the raised region 84 may ease attachment and detachment of the accessory 14 from the mobile device case 10.

Figure 9:
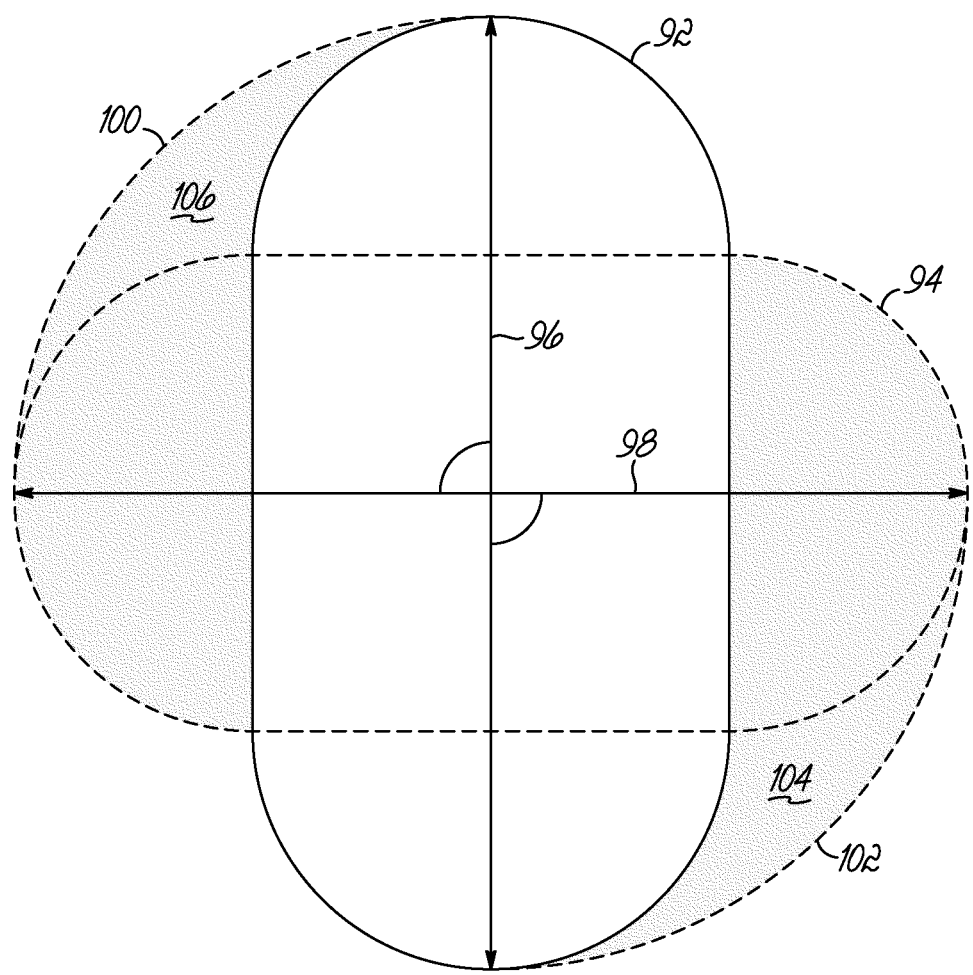
FIG. 9 is a schematic construction of a male-female connection according to one embodiment of the invention.

Referring to FIG. 9, in one embodiment, the symmetry of the opening 32 and the recesses 54, 56 may be described with relation to overlapping ovals 92, 94. With reference to FIG. 6 as it relates to FIG. 9, an outline tracing inner wall 34 at 50 combined with the peripheral wall 60, the additional inner wall 34 at 50, and the peripheral wall 62 may be constructed by the overlapping ovals 92, 94. In FIG. 9, the ovals 92, 94 are of the same size and shape but are rotated relative to one another by about 90°. An axis 96 of the oval 92 is generally perpendicular to an axis 98 of the oval 94. Each axis 96, 98 bisects the respective rounded ends of the ovals 92, 94. This relative rotation between the ovals 92, 94 traces a path 100 and a path 102 between each of the ends of the axes 96 and 98. The configuration of the opening 32 and the recesses 54, 56 may therefore be defined by portions of the oval 94 and the paths 100 and 102, as is indicated by shaded areas 104 and 106.

Figure 10:
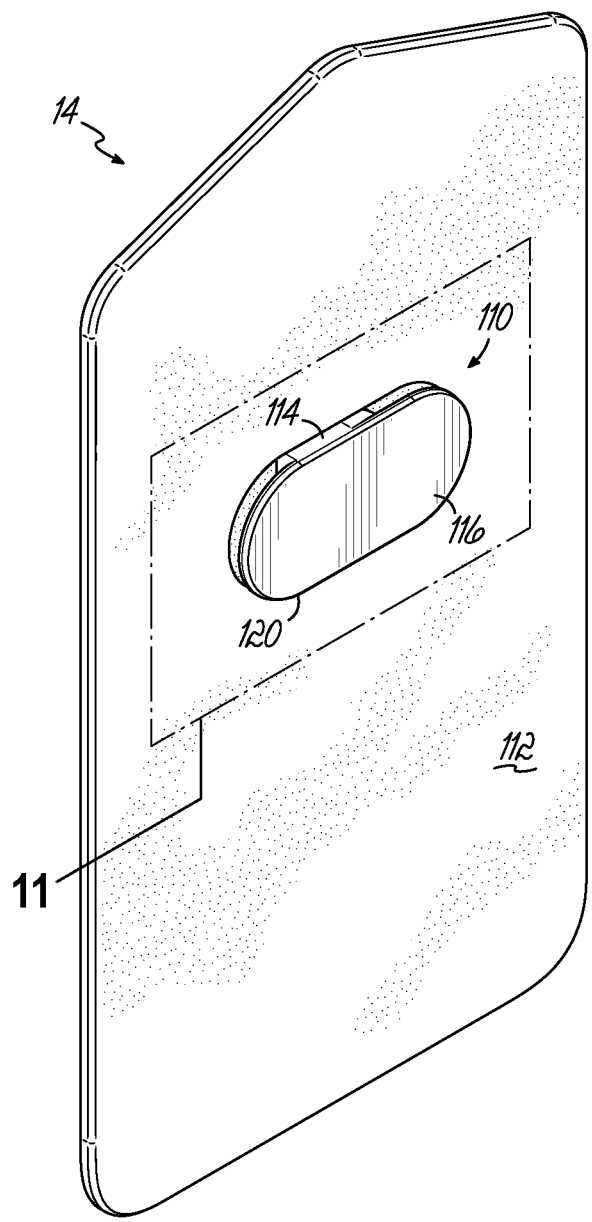
FIG. 10 is an accessory for use with the mobile device case shown in FIG. 1 according to one embodiment of the invention.

As is described above, the mobile device case 10 (e.g., shown in FIG. 1) is configured to be coupled to an accessory 14. Referring now to FIGS. 10-19, an exemplary embodiment of the accessory 14 is shown. FIG. 10 illustrates the accessory 14 as a wallet, which is configured to receive various ID cards, credit cards, and money and is, in that regard, similar to wallets known in the art. Other accessories include a spare battery, a car mount, a folding ring stand. Embodiments are not limited to a wallet as shown and described. The exemplary wallet 14 includes a male portion 110 attached or otherwise formed onto a surface 112 of the wallet 14. The male portion 110 is configured to be inserted into and coupled to the mobile device case 10 via the opening 32, described above, and so forms a male connector of the male-female connection. The details of the male portion 110 are described with reference to FIGS. 11-19.

As is generally indicated in FIGS. 11-19, the male portion 110 projects beyond the surface 112 of the wallet 14 by a distance sufficient to engage the opening 32 of the mobile device case 10. In that regard, the male portion 110 has a T-shape including a post 114 extending from the surface 112 at one end with a crossmember 116 at the other end of the post 114. While the male portion 110 is described in a manner that suggests that the post 114 and the crossmember 116 are separate, it will be appreciated that the male portion 110 may be integrally formed and/or integral with the wallet 14 or formed by one or more separate pieces attached to one another. Embodiments of the invention are not limited to separately formed or integral components.

Figure 20:
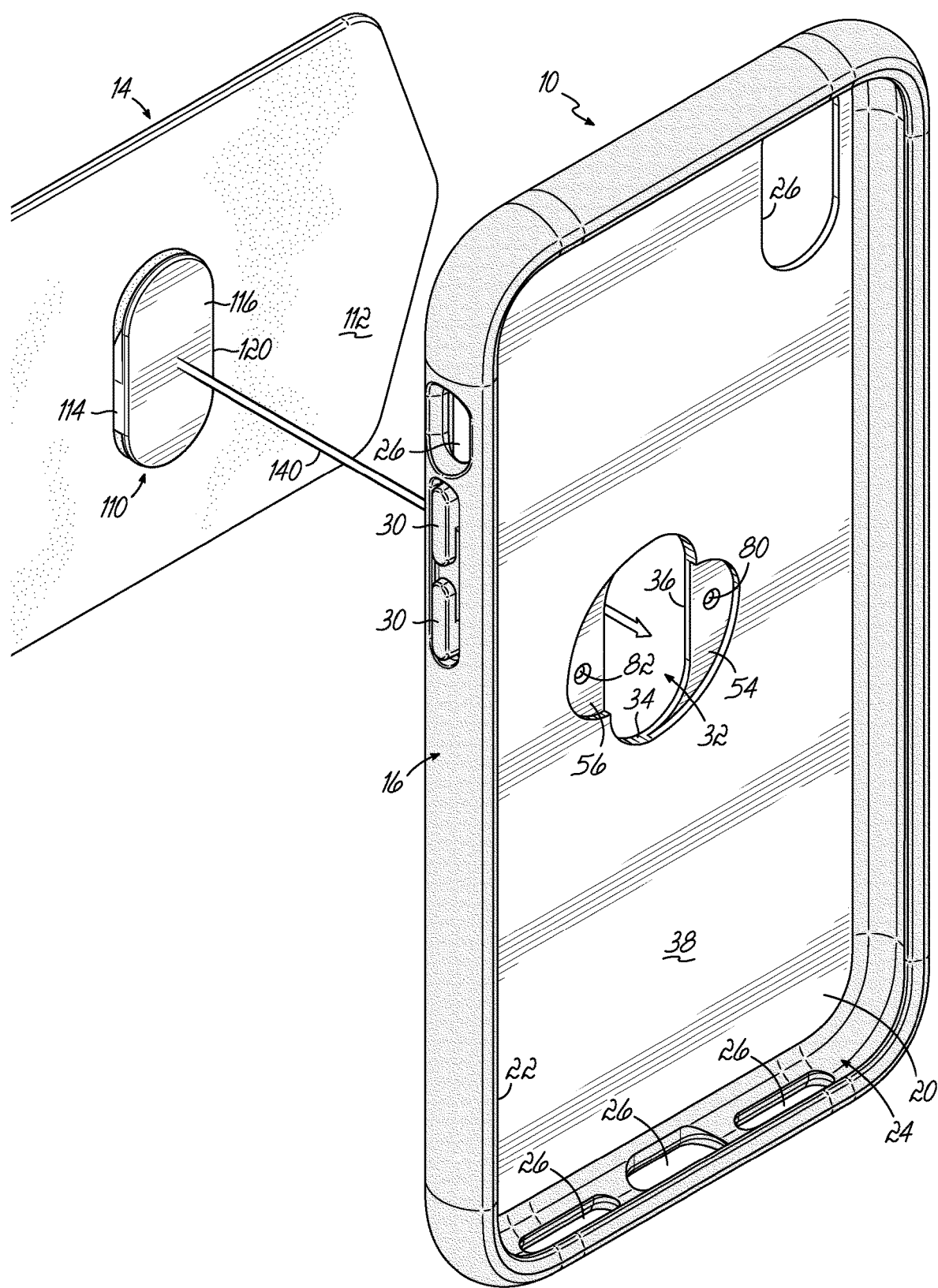
FIGS. 20-26B illustrate a method of coupling a mobile device case with an accessory according to embodiments of the invention.
Figure 21:
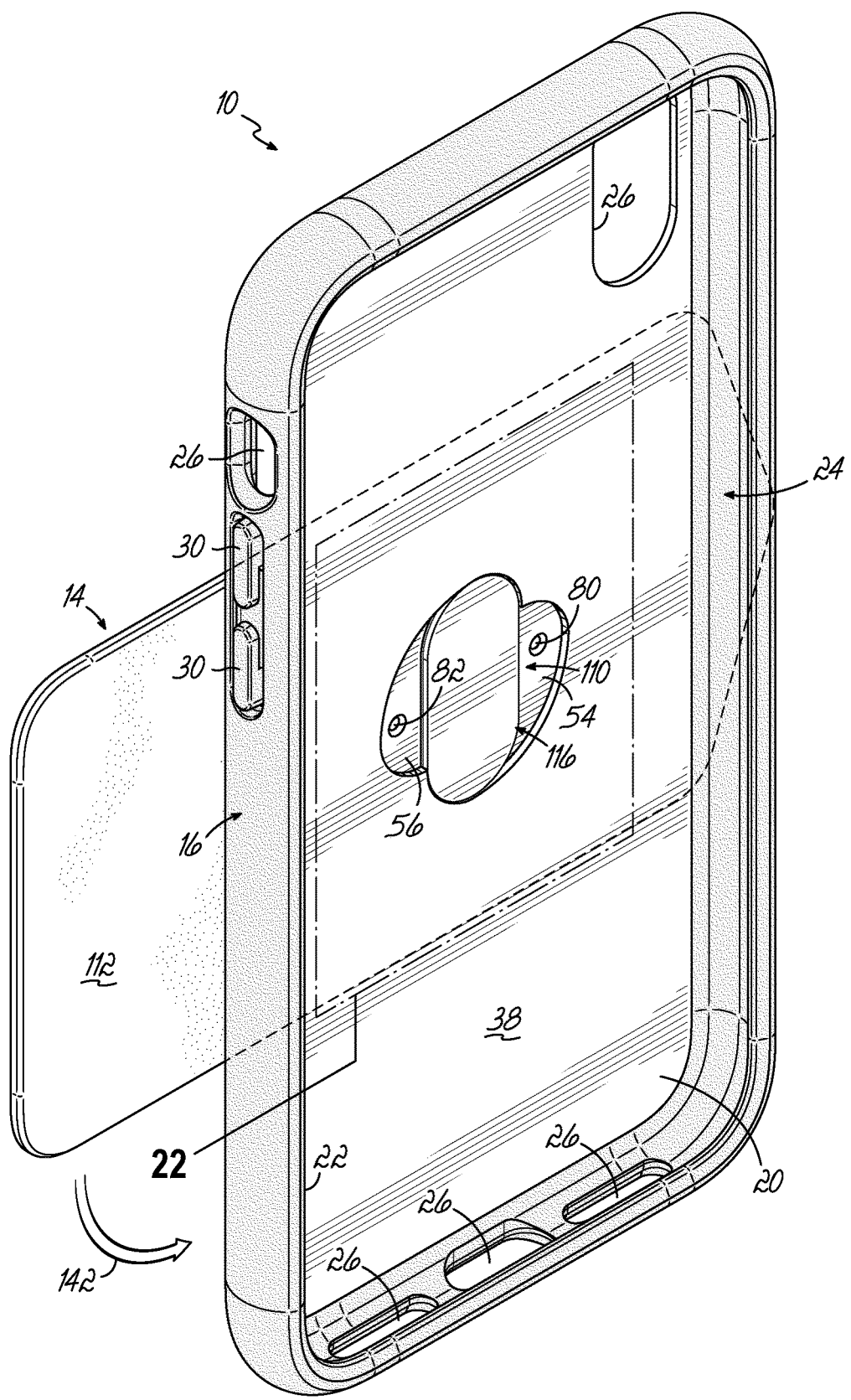

With reference to FIGS. 11 and 14 and in one embodiment, the crossmember 116 has a peripheral edge 120 that is similar or the same shape as the periphery 36 of the opening 32. In the exemplary embodiment, the crossmember 116 has an oval shape with opposing straight sides 122 and 124 and rounded ends 126 and 128. The crossmember 116 is smaller in overall dimensions such that it may pass through the opening 32 when the sides 122, 124 and rounded ends 126, 128 are aligned with the corresponding sides and rounded ends of the opening 32, which is shown in FIGS. 20 and 21, described below.

With reference to FIGS. 13 and 15, in one embodiment, the post 114 is smaller than the crossmember 116 and at least one dimension, e.g., a width dimension W (FIG. 15), so that the crossmember 116 extends beyond the post 114 in a T-shape, and the post 114 forms the base of the T. The width dimension of the post 114 is equal to or less than the distance between the straight sides 42 and 44 of the opening 32. In this way, the post 114 fits in a width-wise manner in the opening 32 when the accessory 14 is rotated relative to the mobile device case 10.

With reference to FIGS. 12, 13, 15, 16, and 17, the crossmember 116 may cantilever beyond the post 114 and so provide opposing wings 130 and 132, which cooperate with the recesses 54, 56. The wings 130 and 132 are spaced apart from the surface 112 by a gap. Further in that regard, the crossmember 116 has a thickness, T, (FIG. 18) that is less than or equal to the depth of the corresponding recess 54, 56. In this way, during rotation of the wallet 14 relative to the mobile device case 10, the wings 130 and 132 may slide into the corresponding spaces between the mobile device 12 and the recessed surfaces 70, 72 provided by the recesses 54 and 56. Each wing 130 and 132 includes a protrusion 134, 136 that is configured to engage a corresponding one of the depressions 80, 82 located in recesses 54, 56 (e.g., shown in FIG. 5).

As described above, the mobile device case 10 and the accessory 14 are rotatably coupled together. In one embodiment, rotation locks the accessory 14 and mobile device case 10 together. This is shown by way of FIGS. 20-22B, in which the male portion 110 of the accessory 14 and the opening 32 of the mobile device case 10 are aligned. In this regard, the periphery 36 of the opening 32 is aligned with the peripheral edge 120 of the male portion 110 and the male portion 110 is then inserted through the opening 32 in accordance with the arrow 140 in FIG. 20. After insertion of the male portion 110 into opening, the accessory 14 may be oriented as shown in FIG. 21 relative to the mobile device case 10.

Figure 22:
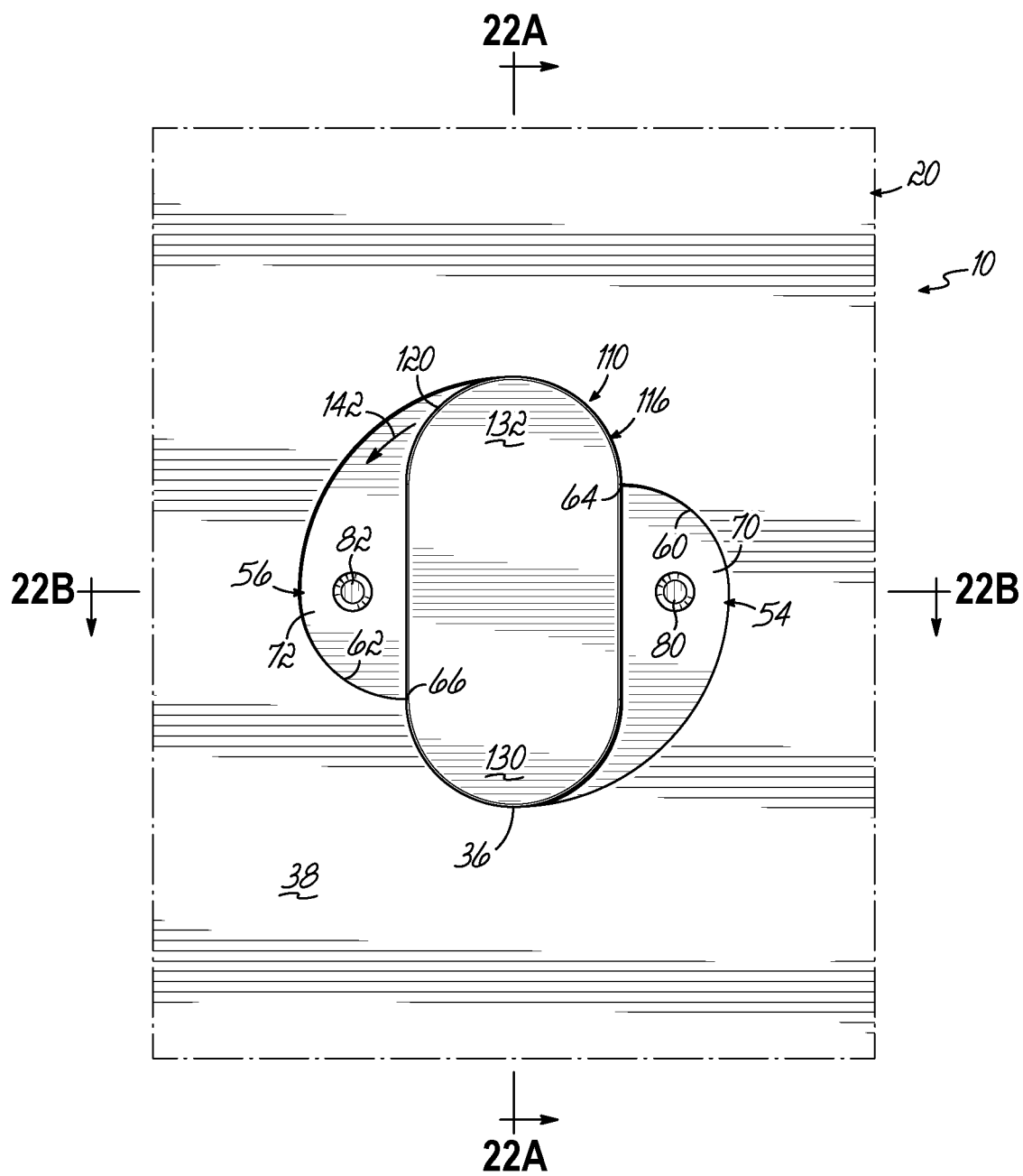
Figure 22A:
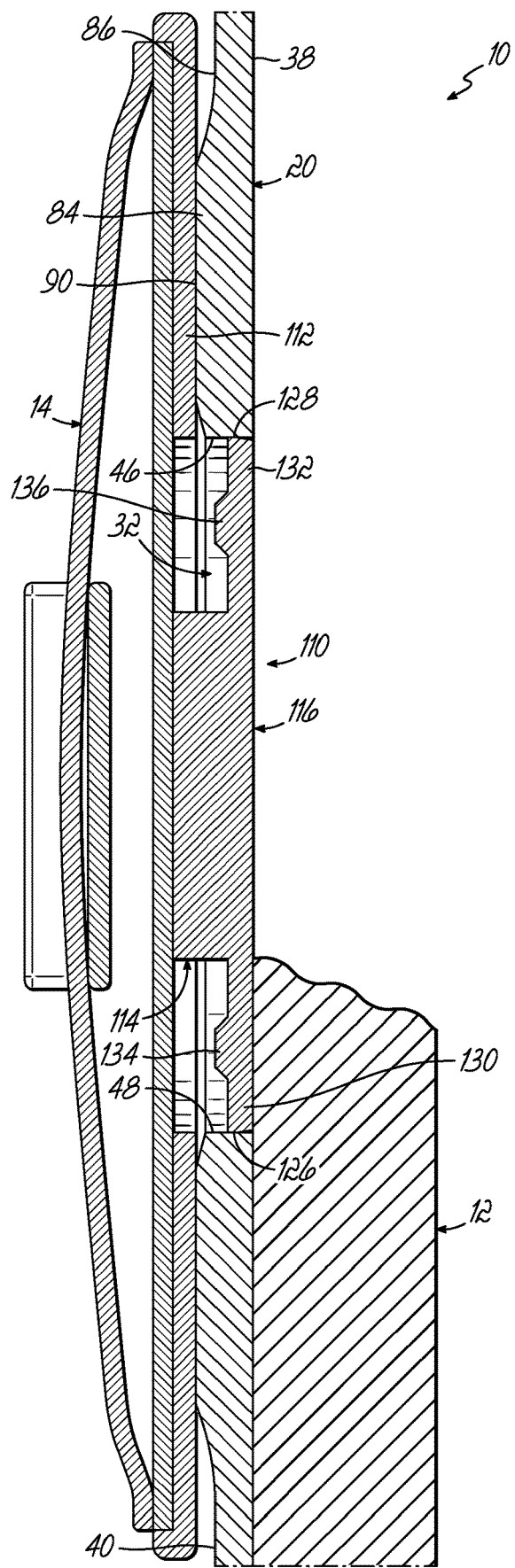
Figure 22B:
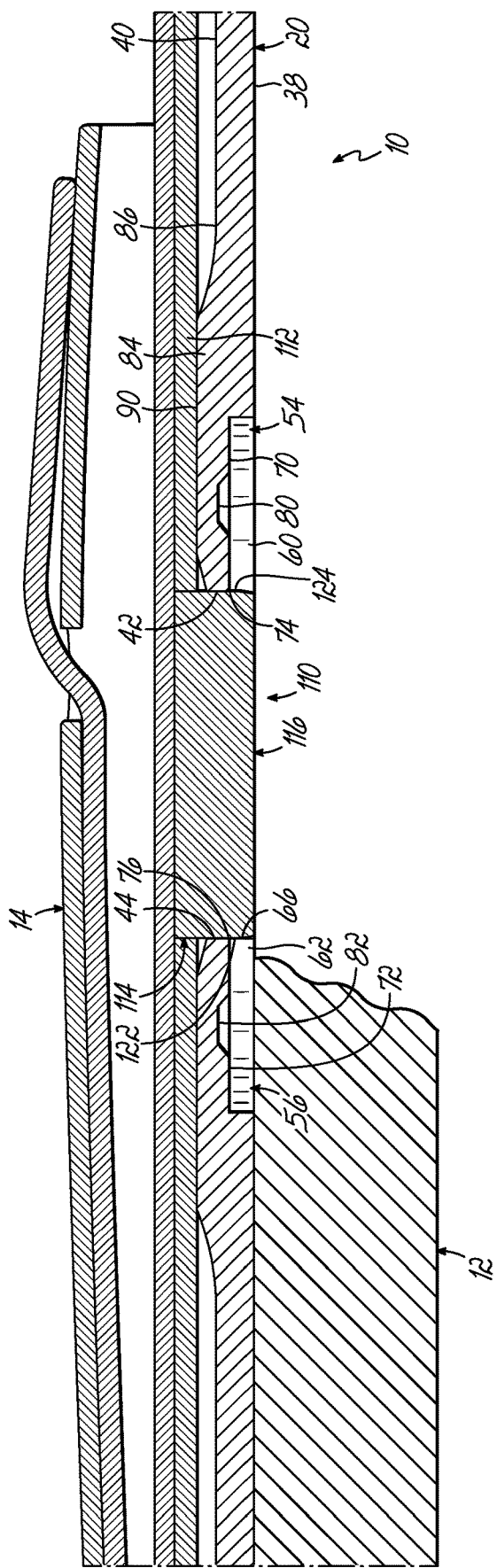

As is best shown in FIGS. 22, 22A, and 22B, at insertion, the surface 112 of the accessory 14 abuts the planar surface 90 of the mobile device case 10 instead of the entirety of the base side 40. Thus, the surface-to-surface contact between the accessory 14 and the mobile device case 10 is limited to the planar surface 90 and not the full extent of the surface 112 of the accessory 14. Advantageously, this may enable the user to more easily assemble and disassemble the accessory 14 and the mobile device case 10.

Once the crossmember 116 is received within a cavity formed by the opening 32 and the recesses 54, 56 and the mobile device 12 (not shown), the accessory 14 is rotated from the insertion position in accordance with the arrow 142 in FIGS. 21 and 22 toward a locked position.

Figure 23:
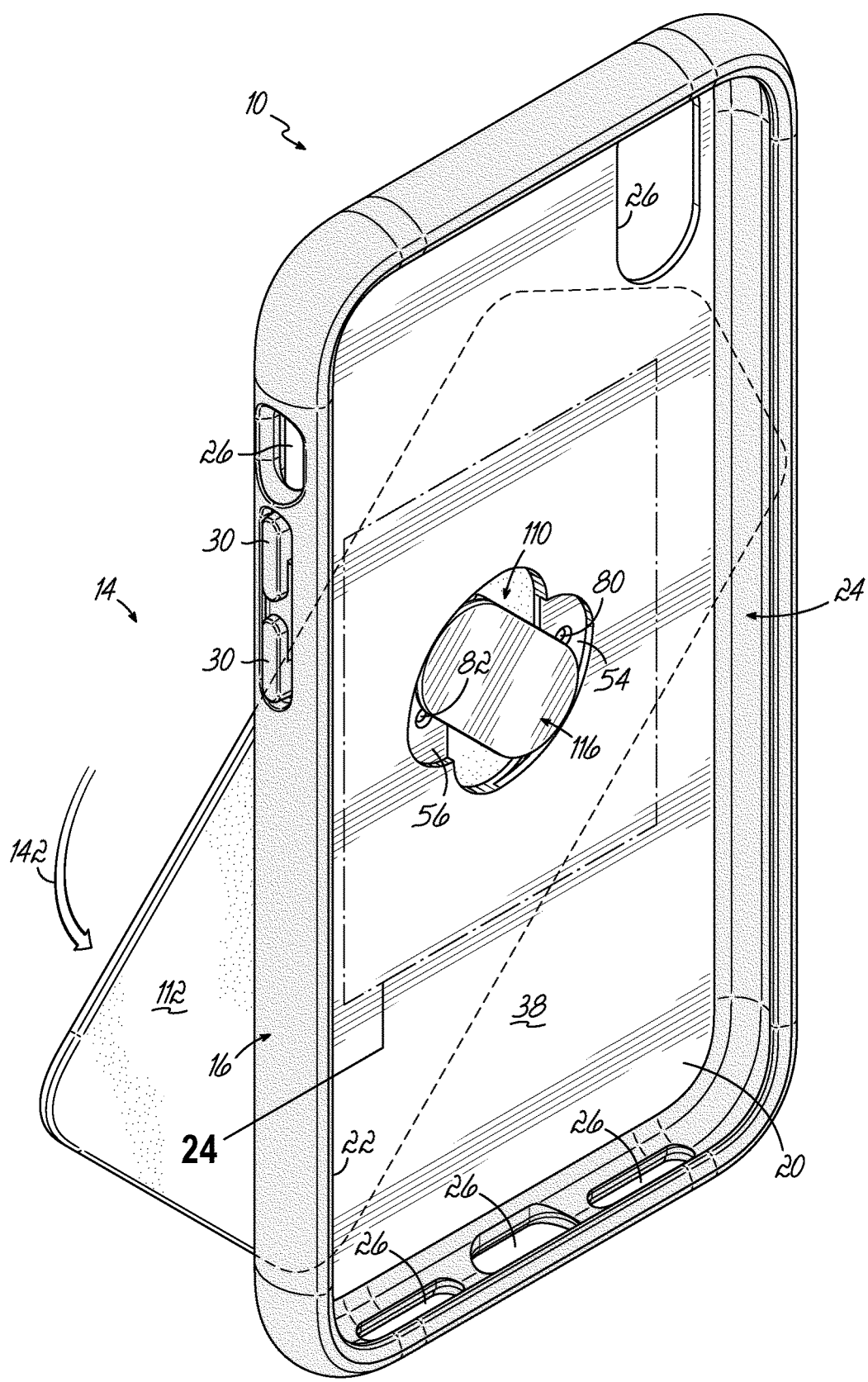

With continued reference to FIGS. 21, 22, 22A, and 22B rotation of the accessory 14 relative to the mobile device case 10 in accordance with the arrow 142 rotates the male portion 110 relative to the opening 32. The wings 130 and 132 of the male portion 110 rotate into the respective recesses 54, 56 as is shown in FIGS. 23 and 24.

Figure 25:
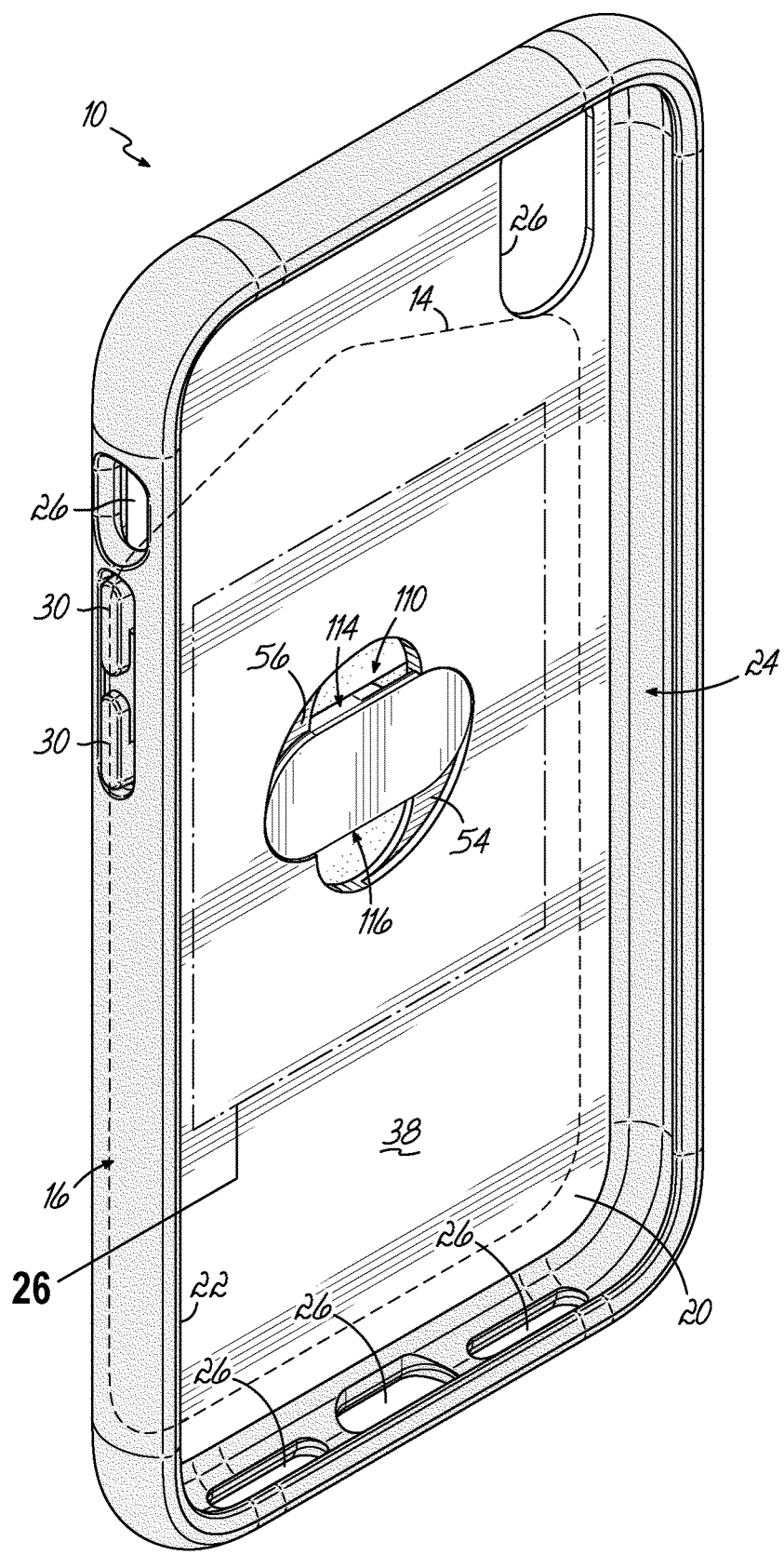
Figure 26:
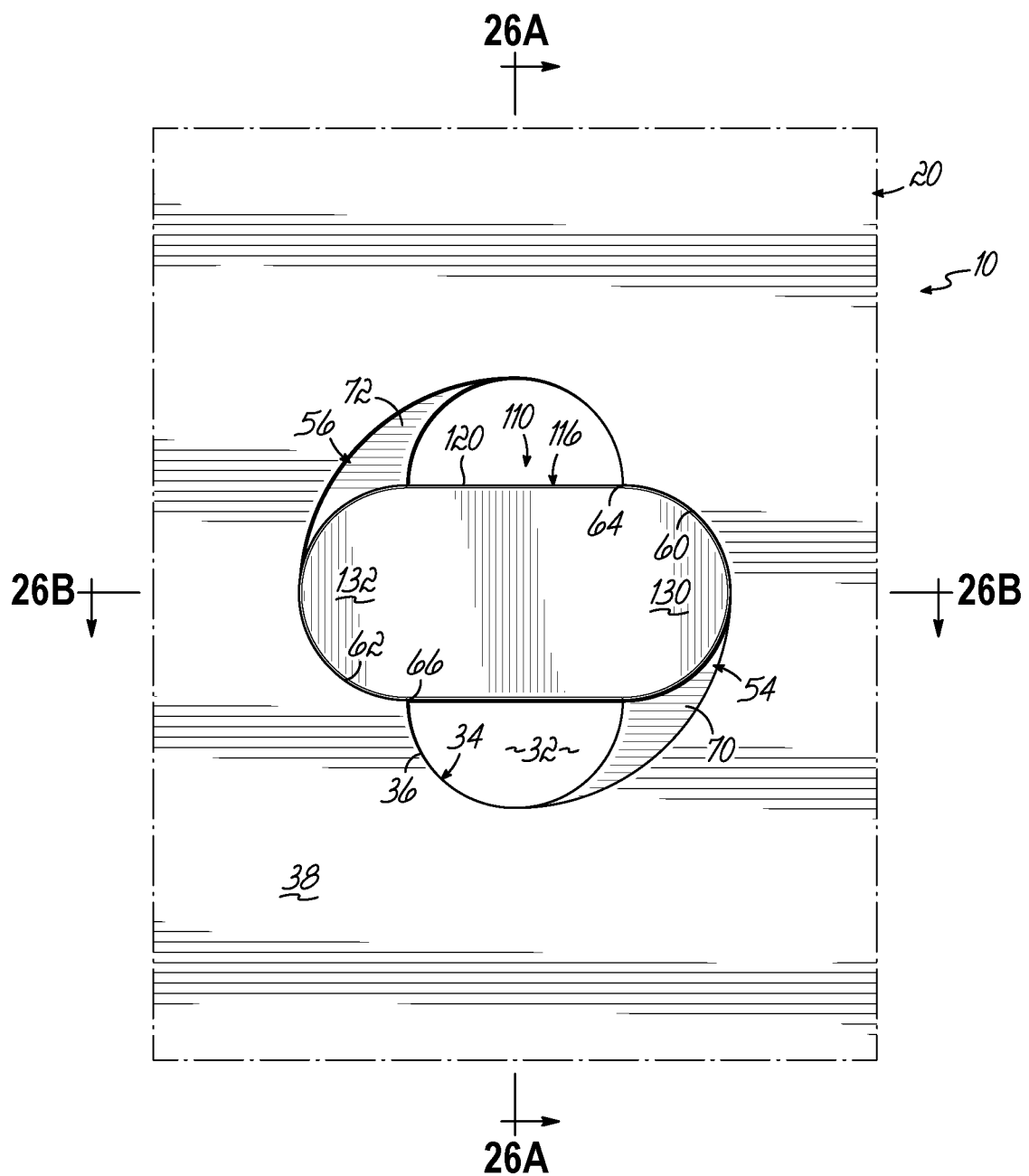
Figure 26A:
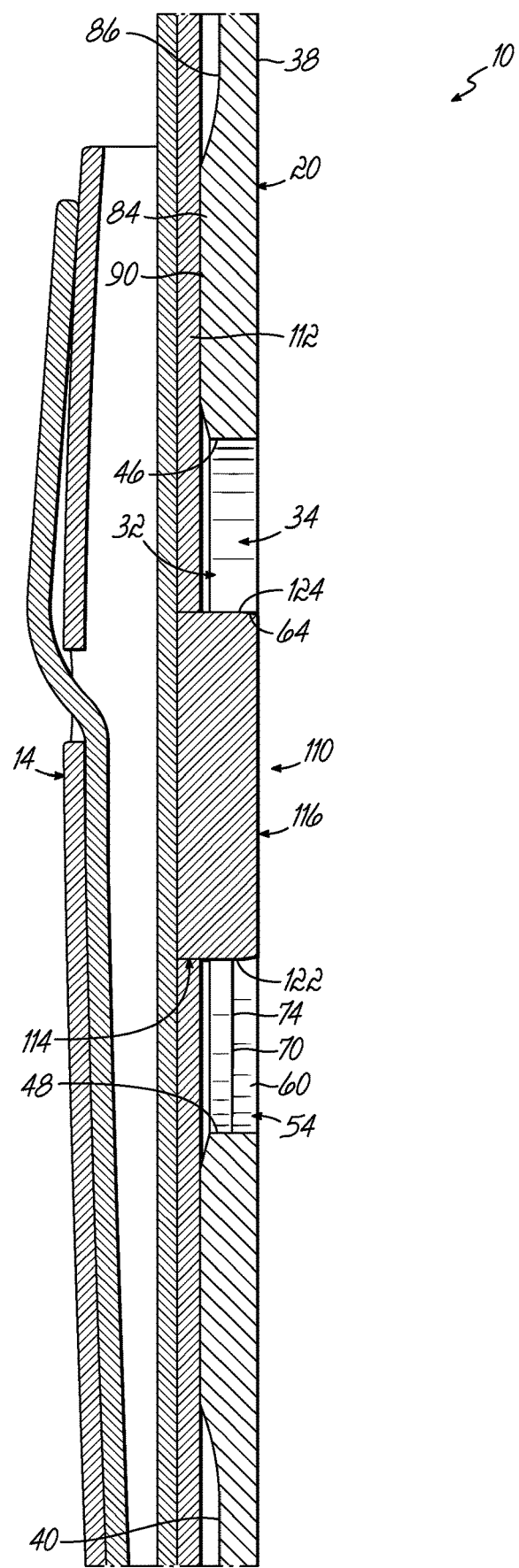
Figure 26B:
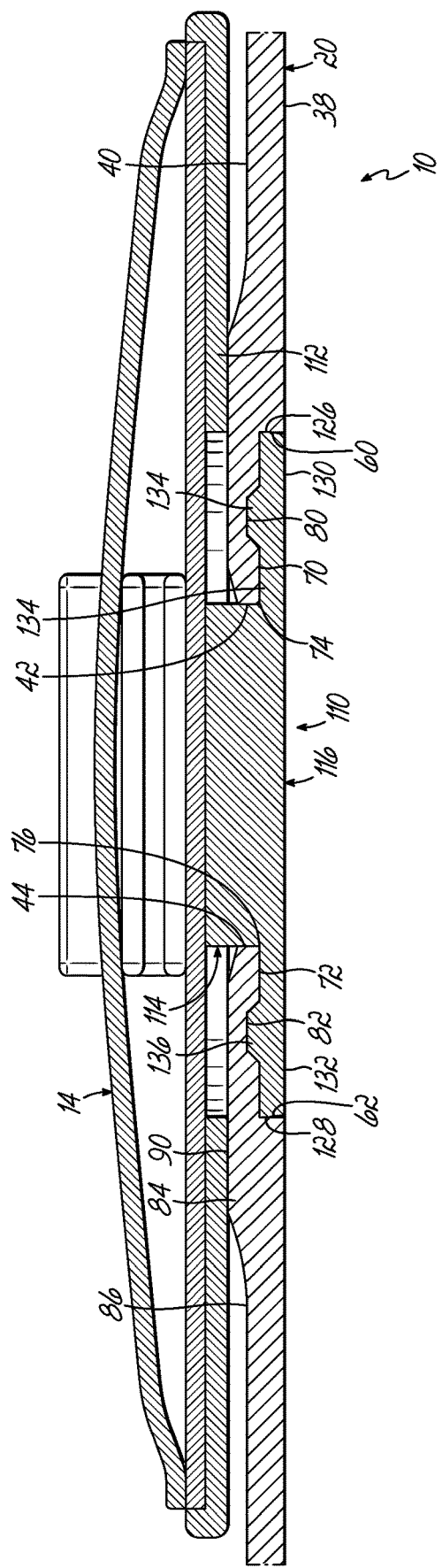
Figure 27:
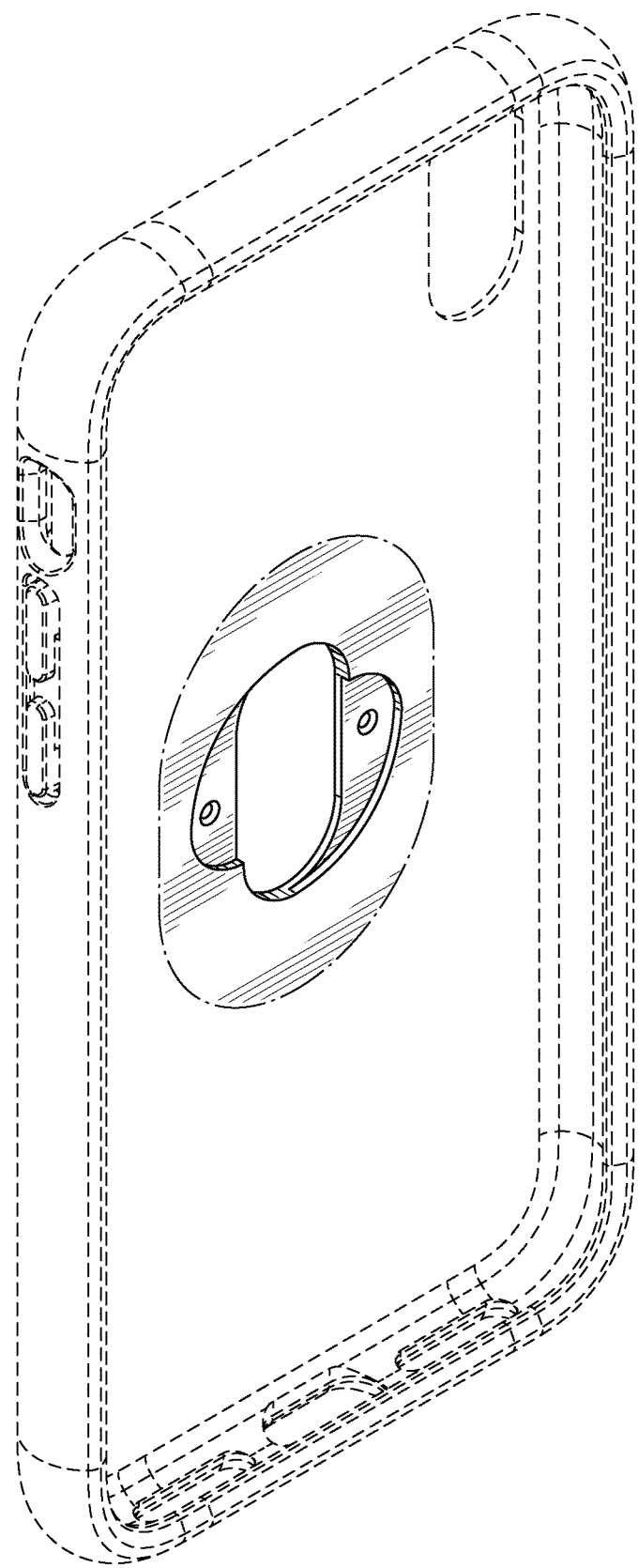
FIG. 27 is a front-left perspective view of an opening in a mobile device case showing environment according to the present invention.
Figure 28:
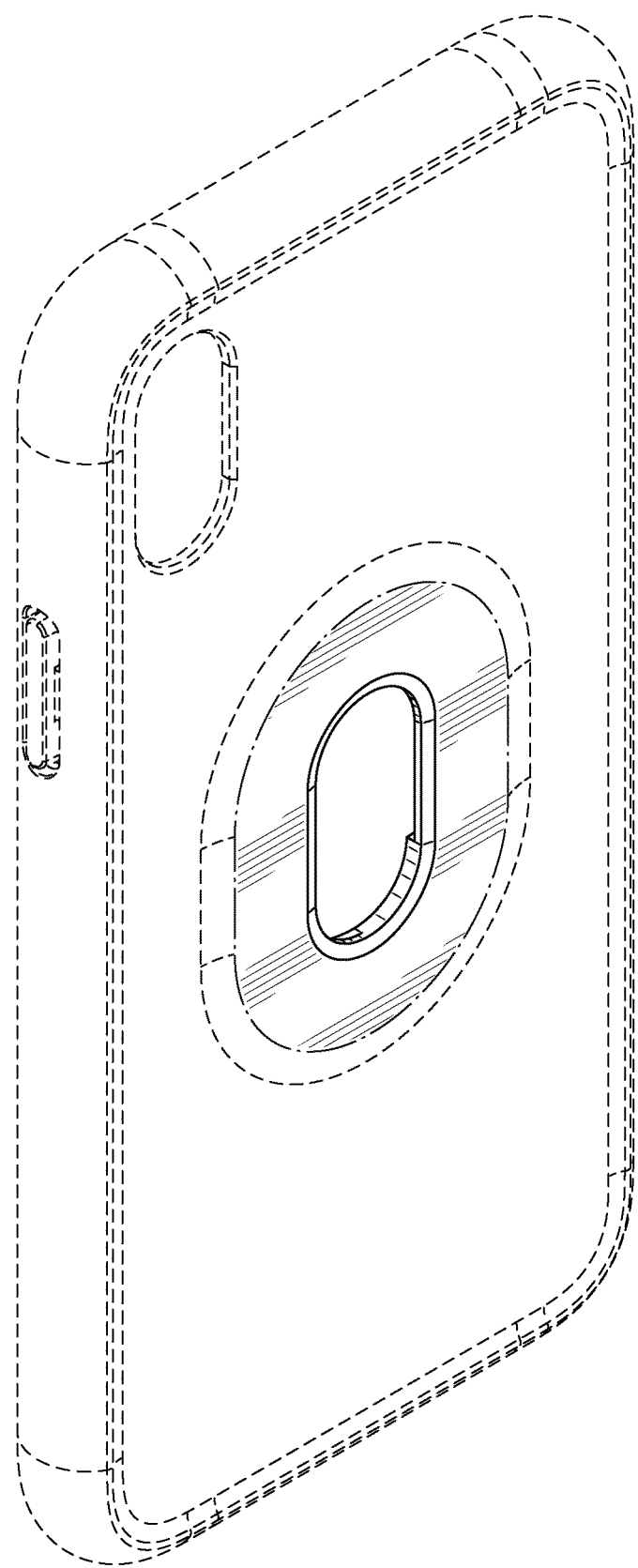
FIG. 28 is a rear-right perspective view of an opening in a mobile device case showing environment according to the present invention.
Figure 29:
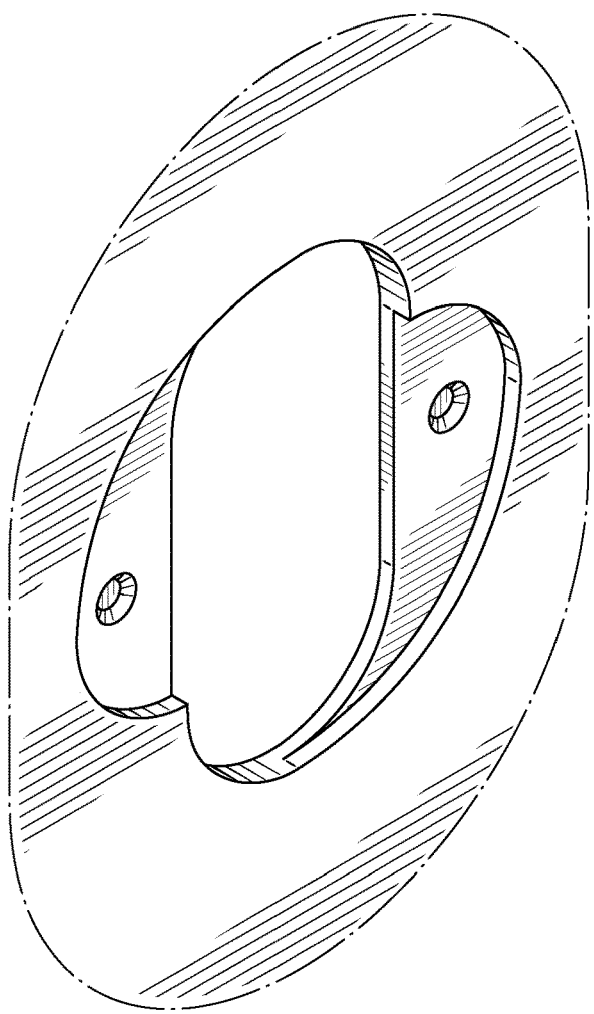
FIG. 29 is an enlarged perspective view of the opening shown in FIG. 27.
Figure 30:
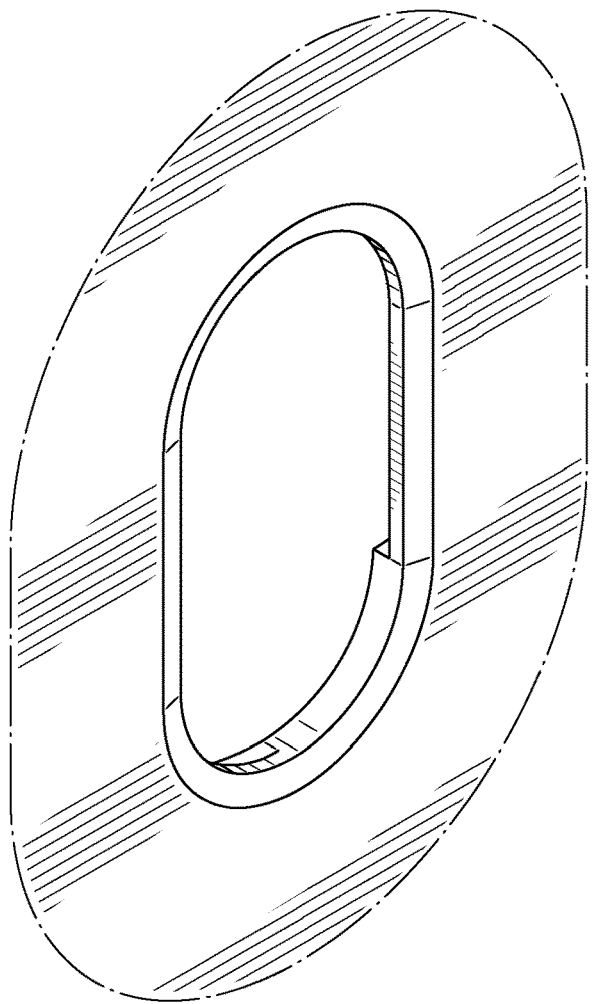
FIG. 30 is an enlarged perspective view of the opening shown in FIG. 28.
Figure 31:
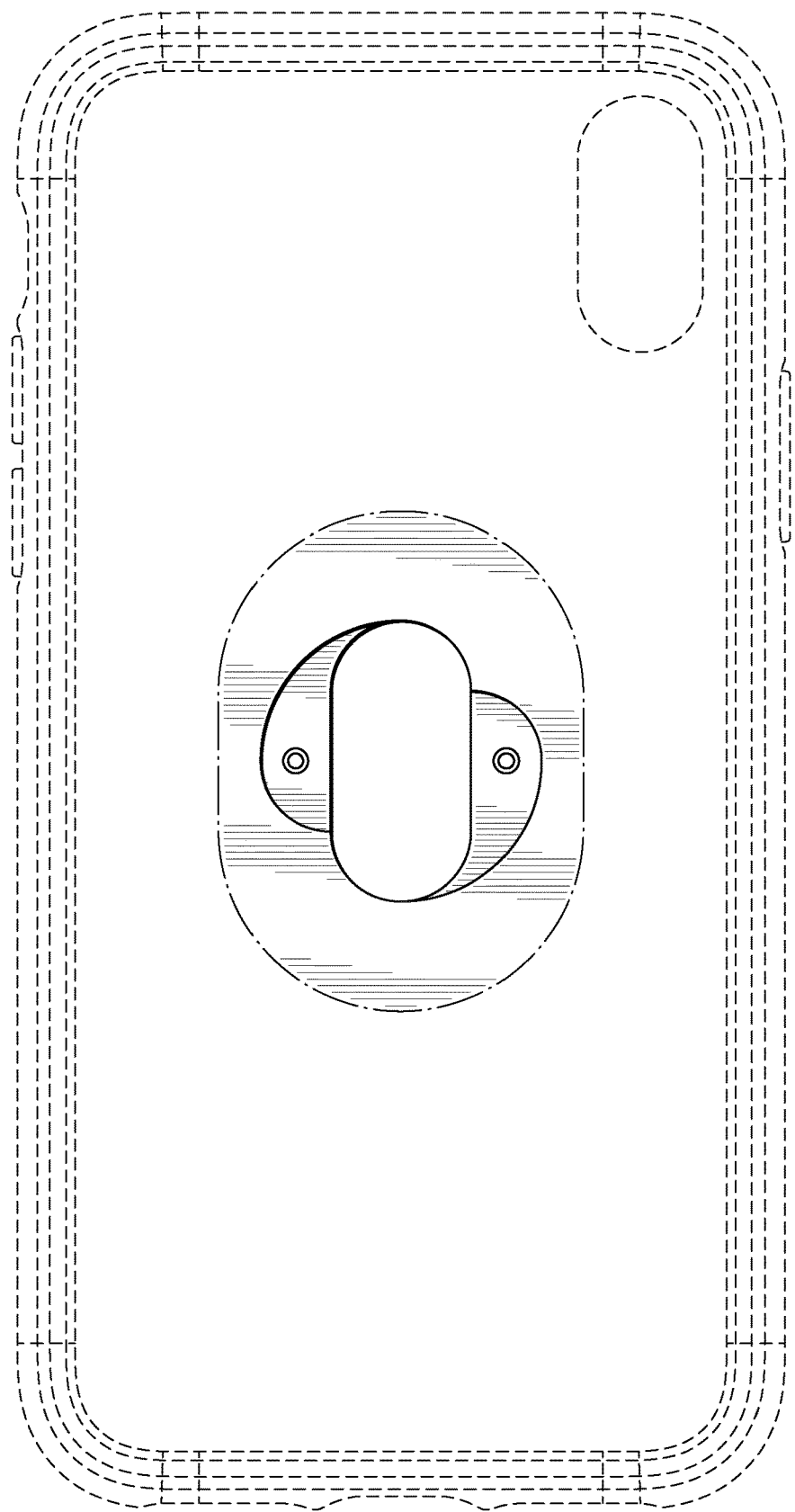
FIG. 31 is a front elevation view of FIG. 1.
Figure 32:
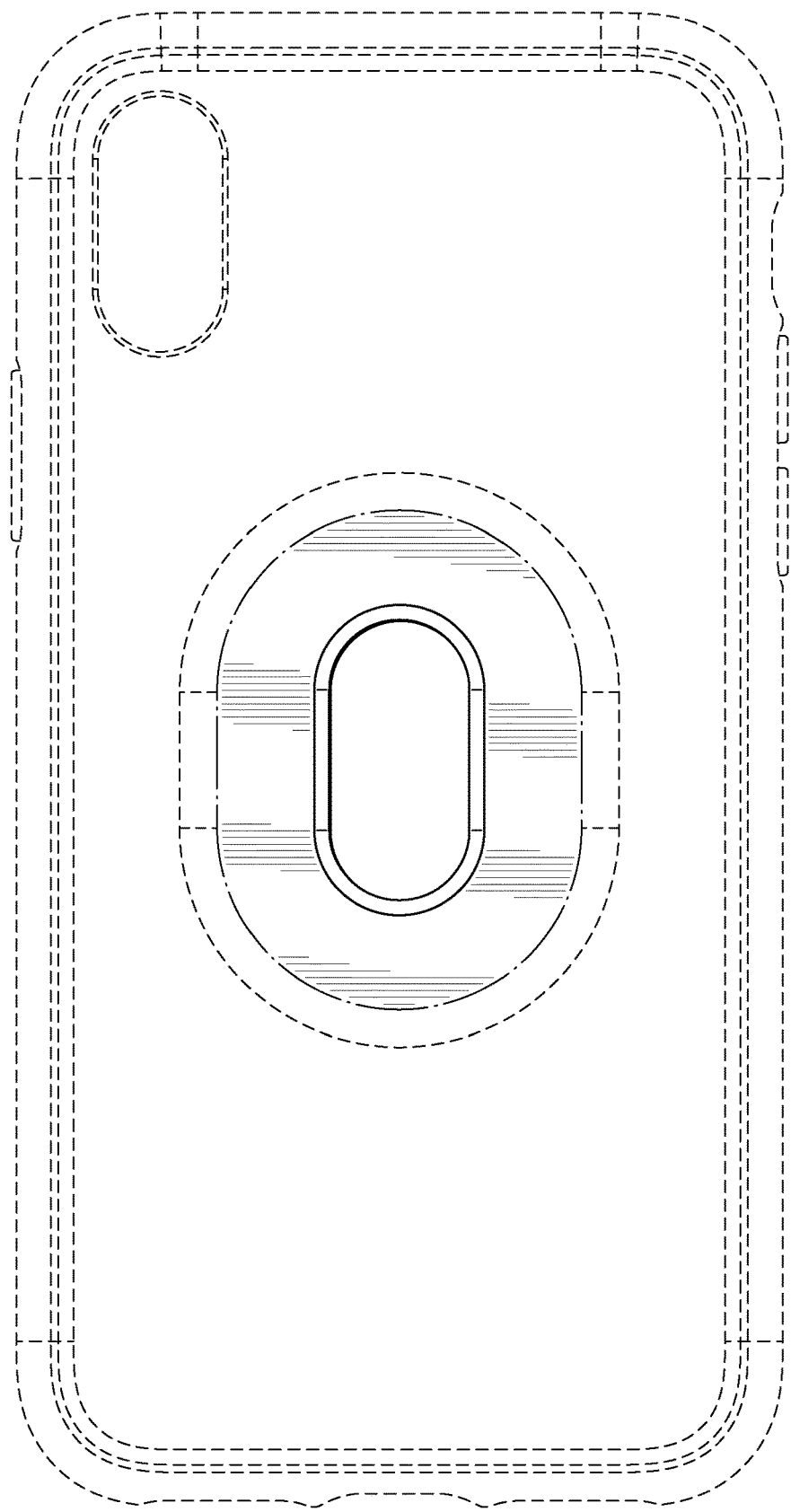
FIG. 32 is a rear elevation view of FIG. 1.
Figure 33:
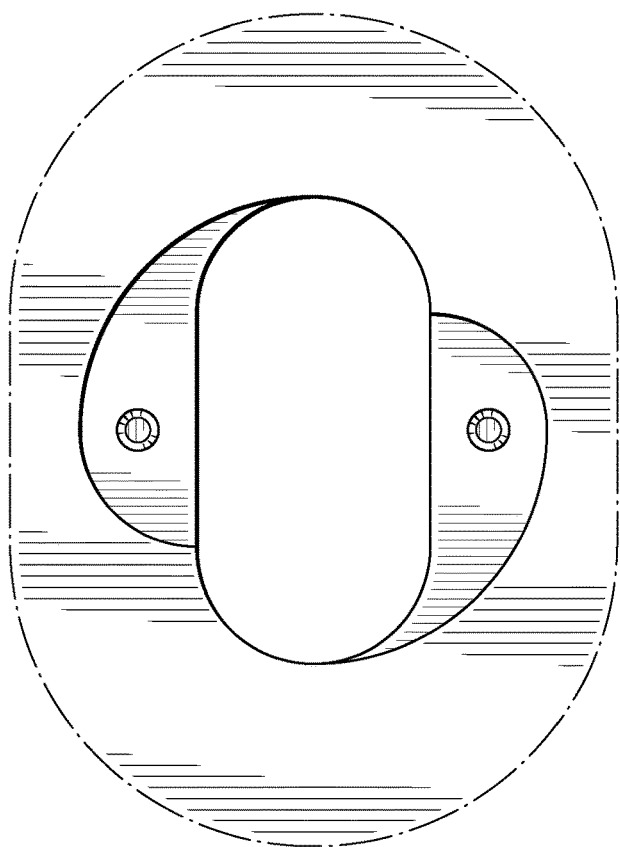
FIG. 33 is a front elevation view of the opening shown in FIG. 1.
Figure 34:
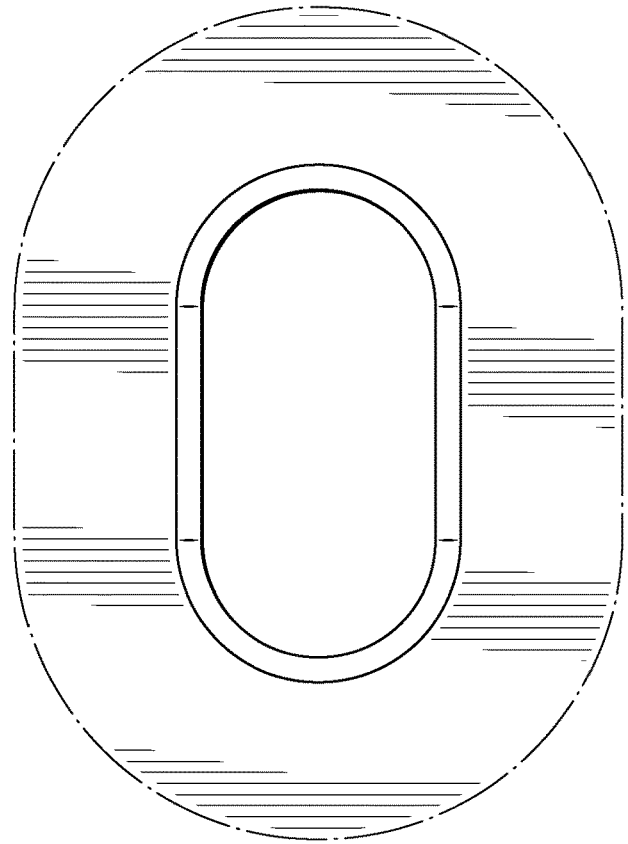
FIG. 34 is a rear elevation view of the opening shown in FIG. 1.
Figure 35:
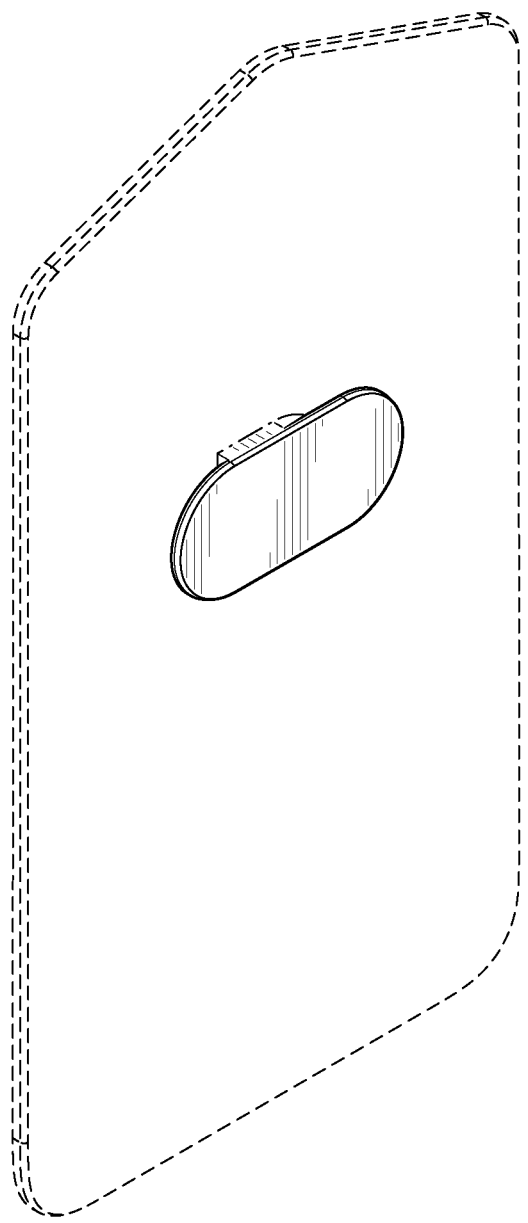
FIG. 35 is a front-left perspective view of a male portion of an accessory showing environment according to the present invention.
Figure 36:
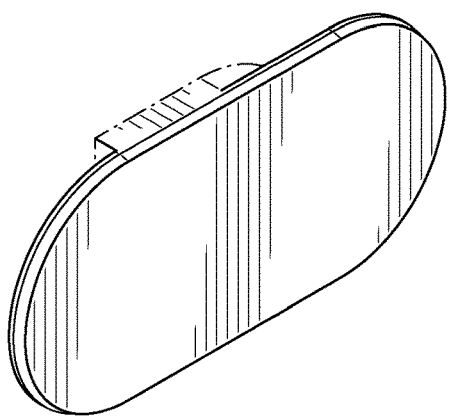
FIG. 36 is a front-right perspective view of the male portion shown in FIG. 35.
Figure 37:
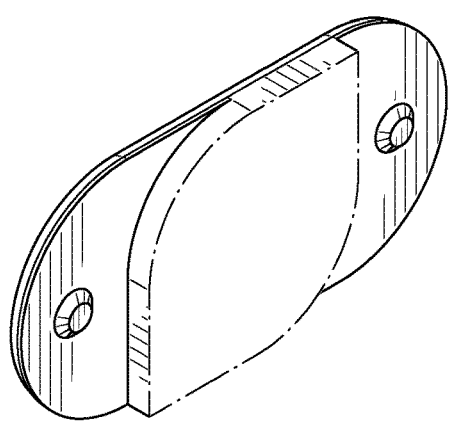
FIG. 37 is a rear-right perspective view of the male portion shown in FIG. 35.
Figure 38:
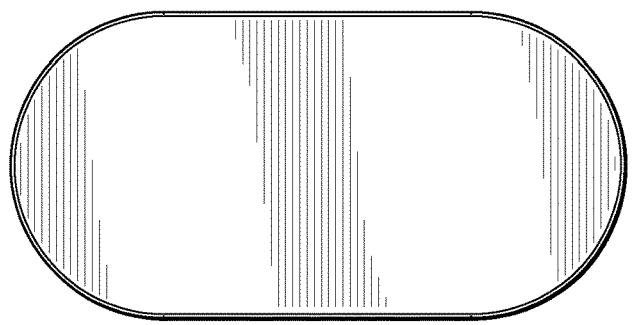
FIG. 38 is a front elevation view thereof.
Figure 39:
FIG. 39 is a rear elevation view thereof.
Figure 40:
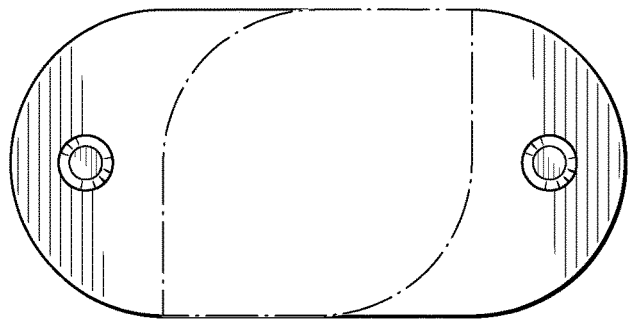
FIG. 40 is a right-side elevation view thereof.
Figure 41:
FIG. 41 is a left-side elevation view thereof.
Figure 42:
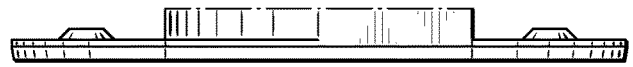
FIG. 42 is a top plan view thereof.
Figure 43:
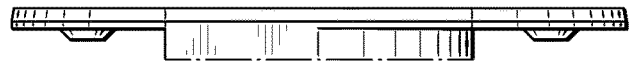
FIG. 43 is a bottom plan view thereof.
Figure 44:
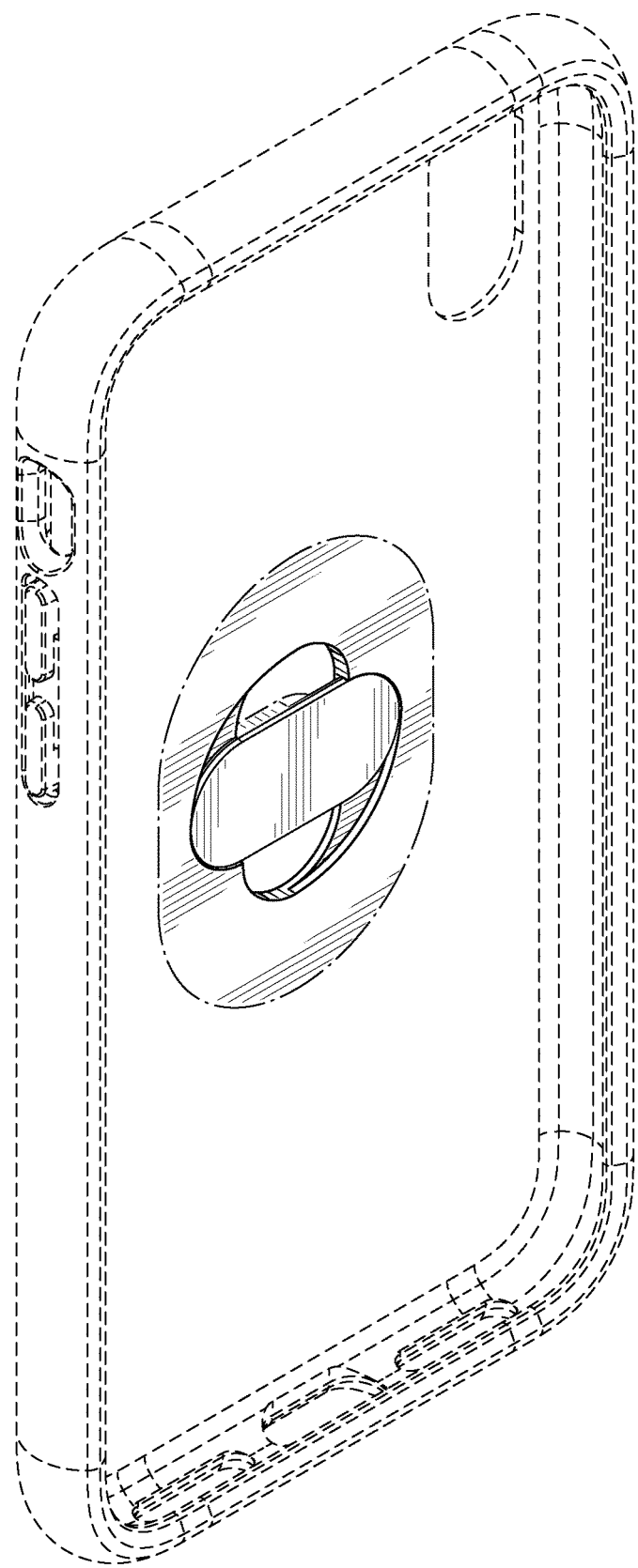
FIG. 44 is a front-right perspective view of a male-female rotational couple according to an alternative embodiment of the present invention.
Figure 45:
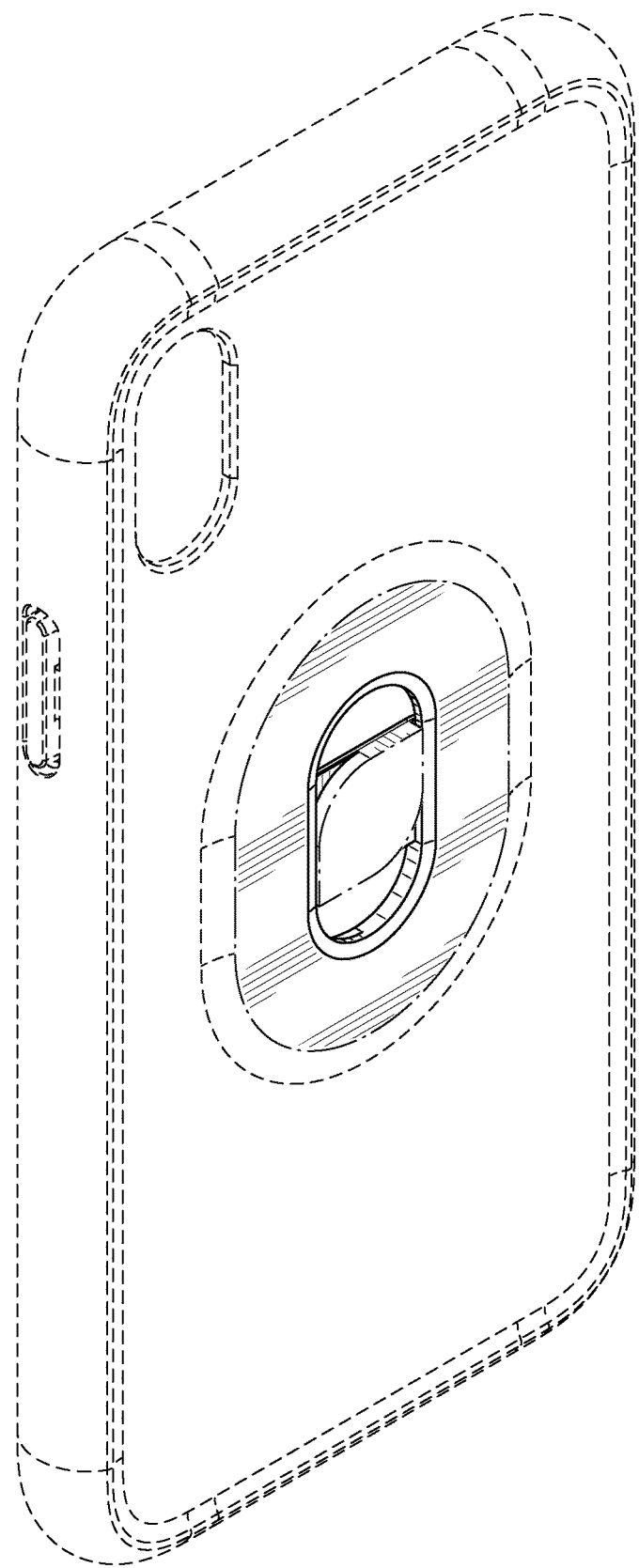
FIG. 45 is a rear-right perspective view of the male-female rotational couple of FIG. 44.
Figure 46:
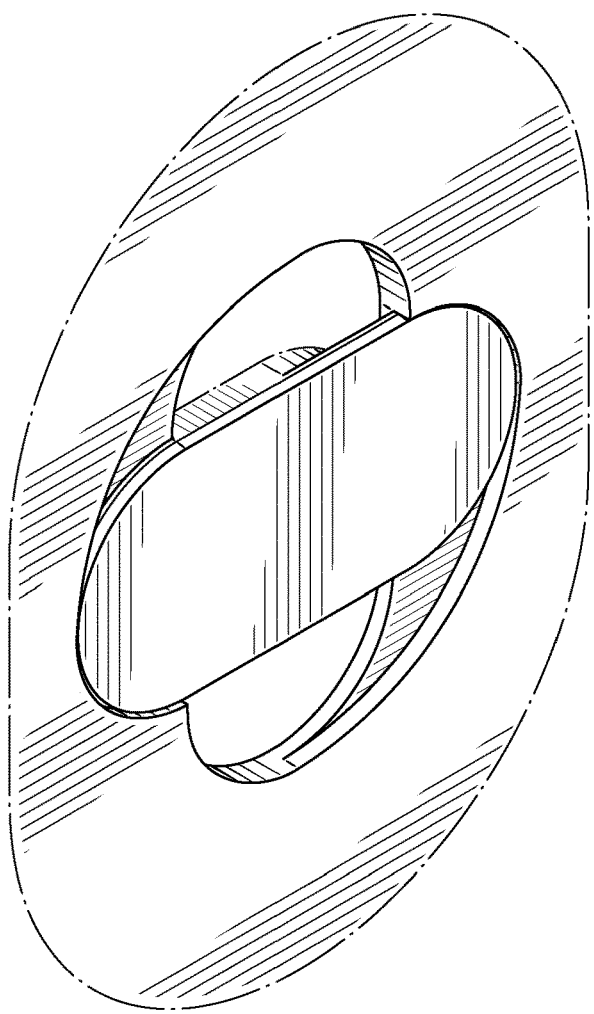
FIG. 46 is an enlarged view of the male-female rotational couple of FIG. 44.
Figure 47:
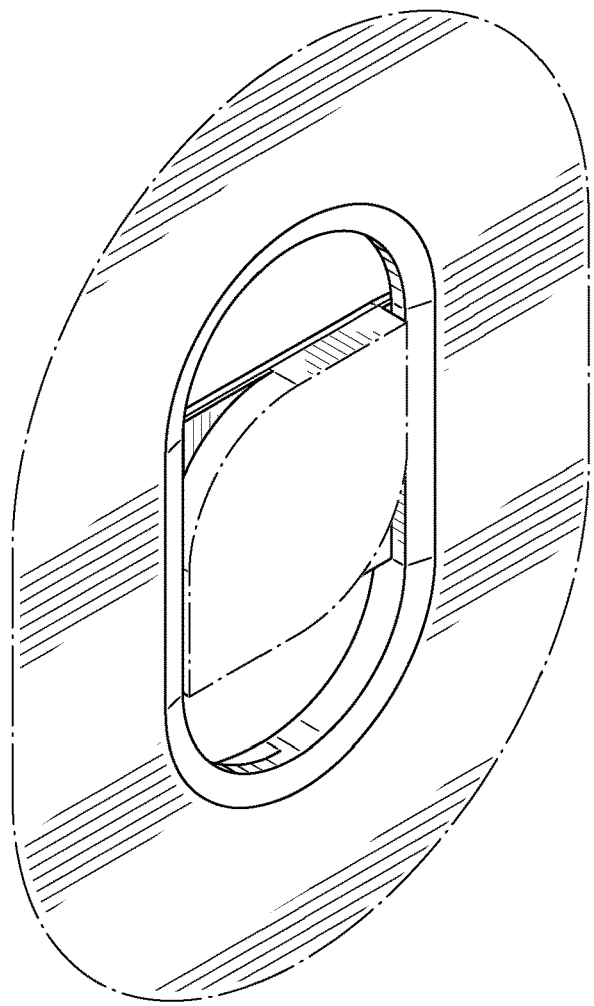
FIG. 47 is an enlarged view of the male-female rotational couple of FIG. 45.
Figure 48:
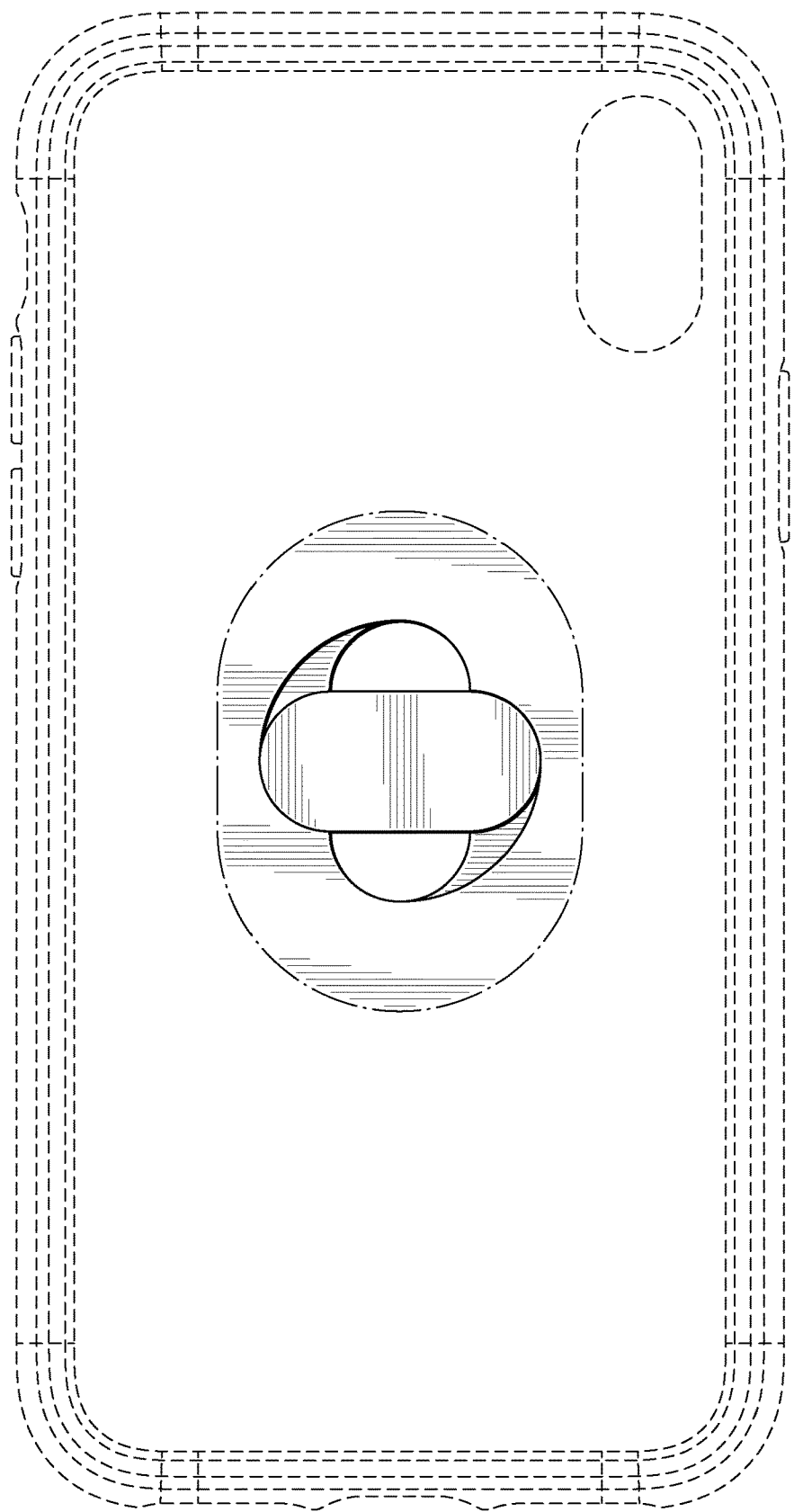
FIG. 48 is a front elevation view thereof.
Figure 49:
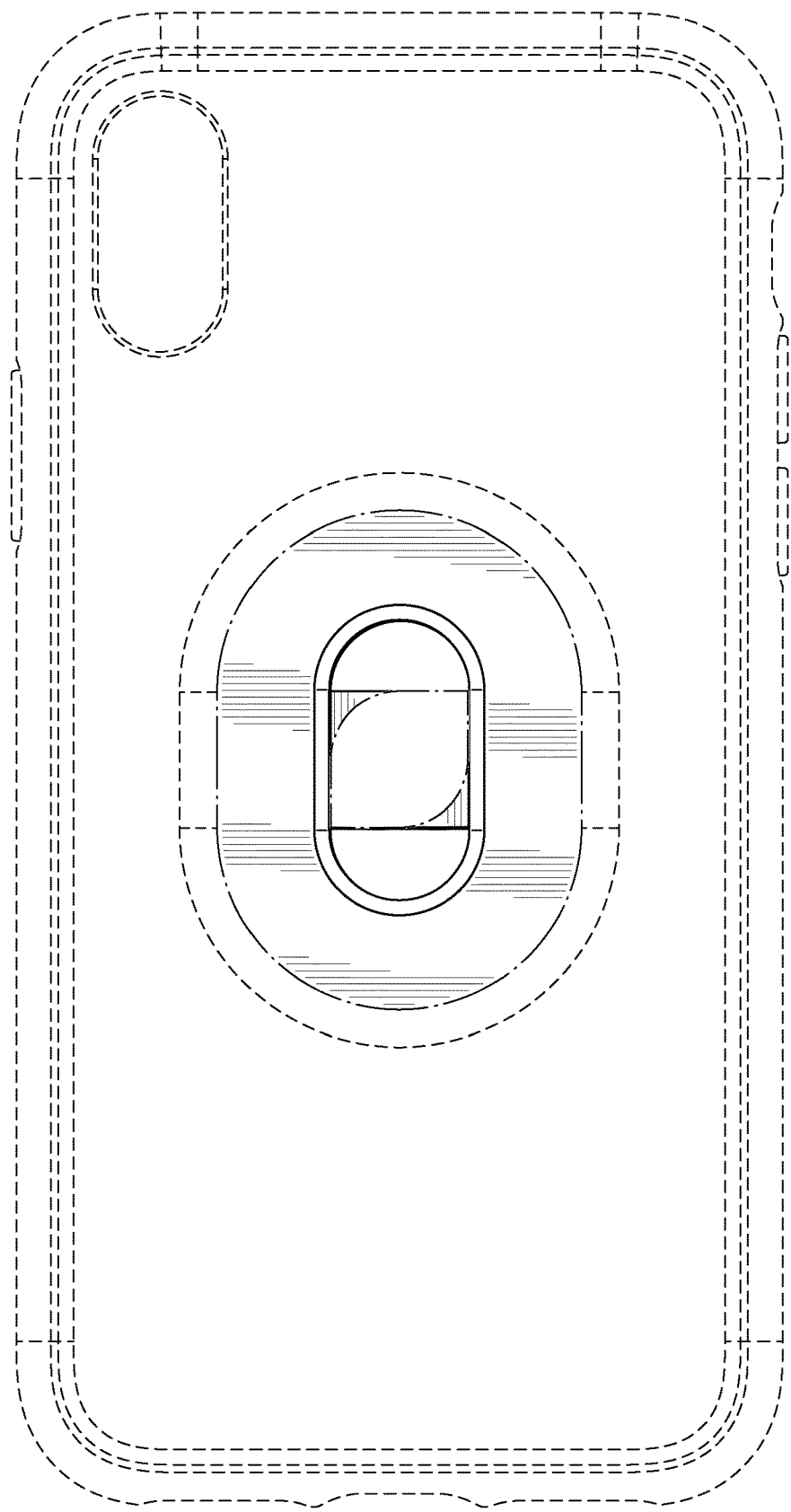
FIG. 49 is a rear elevation view thereof.

Continued relative rotation between the accessory 14 and the mobile device case 10 is limited to the position shown in FIGS. 25 and 26-26B, in which the accessory 14 is shown to have rotated relative to the mobile device case 10 by 90° from the insertion position. At this position, the mobile device case 10 and the accessory 14 are reversibly connected via the male-female connection and further rotation of the accessory 14 relative to the mobile device case 10 is prevented by the shape of the recesses 54, 56. Specifically, the orientation of each of the peripheral walls 60, 62 at their point of intersection with the inner wall 34 of the opening at points 64 and 66 prevents further movement of the male portion 110 in the same rotational direction. The wings 130 and 132 contact the stops at 64 and 66 to prevent further rotation. At or near this location the protrusions 134, 136 may enter the corresponding depressions 80, 82 (best shown in FIG. 26B). At this locked position, the male-female connection prevents inadvertent separation of the accessory 14 from the mobile device case 10 (and mobile device 12) during storage and use.

Figure 24:
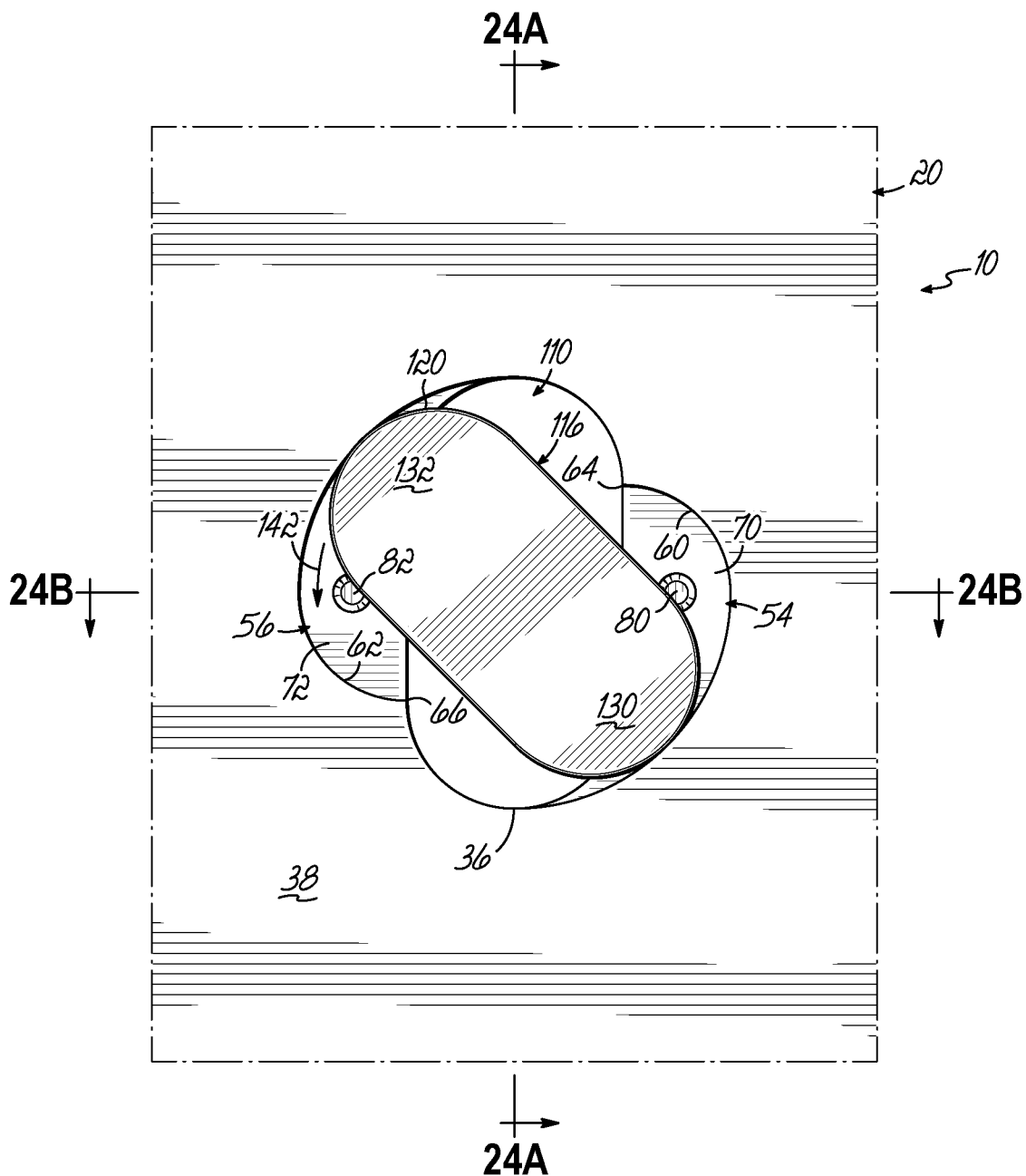
Figure 24A:
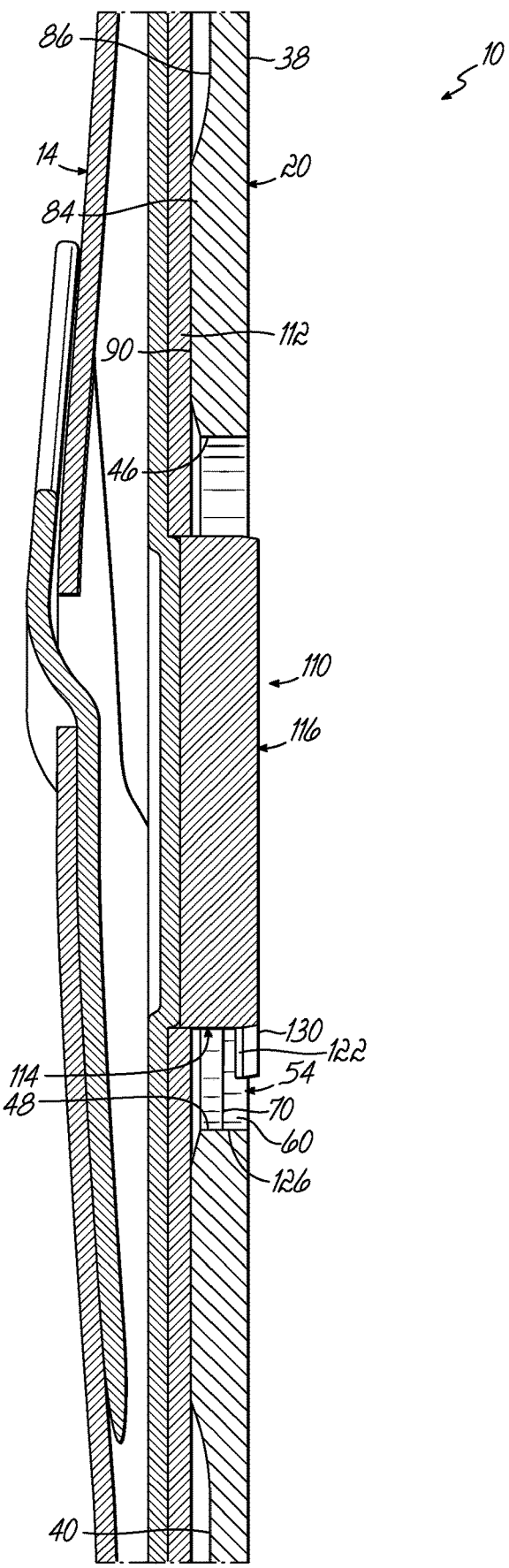
Figure 24B:
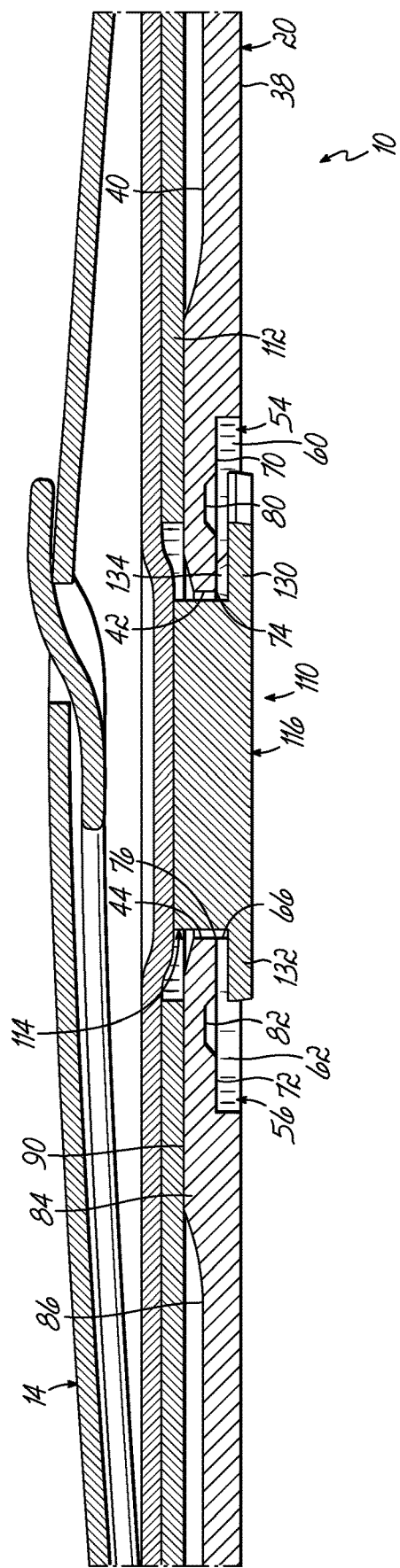

Once at the location shown in FIGS. 25-26B, further rotation in the direction indicated by arrow 142 in FIG. 24 is prohibited by one or both of the stops 64, 66. As shown, a longitudinal axis of the wallet 14 is generally aligned with a longitudinal axis of the mobile device case 10. This produces a uniform and symmetrical aesthetic package of the phone, case, and wallet.

To uncouple, or remove, the accessory 14 from the mobile device case 10 requires that the accessory 14 be rotated in the reverse direction relative to the mobile device case 10. In the exemplary case, a counter rotation of 90° is required to bring the male portion 110 into alignment with the opening 32. In addition to the frictional forces that must be overcome to reverse the rotational direction and uncouple the accessory 14 from the mobile device case 10, a threshold amount of force must be applied to move the protrusions 134, 136 from their corresponding depressions 180, 182. Thus, cooperation between the protrusions 134, 136 and the depressions 180, 182 may reduce or eliminate inadvertent relative rotation sufficient to decouple the accessory 14 from the mobile device case 10.

While the mobile device case 10 is shown and described as having a female connector (e.g., opening 32) of a male-female connection and the accessory 14 is shown and described as having a corresponding male connector of the male-female connection, it will be appreciated that these features may be reversed from that shown. In other words, the male portion 110 may form a portion of the mobile device case 10 and the opening 32 may be formed in the accessory 14. The advantages of the male-female connection are available in this configuration as well. Embodiments of the present invention are not limited to the male portion 110 being on the accessory 14 and the opening 32 being in the mobile device case 10.

While the present invention has been illustrated by a description of various embodiments and while these embodiments have been described in some detail, it is not the intention of the inventor to restrict or in any way limit the scope of the appended claims to such detail. Thus, additional advantages and modifications will readily appear to those of ordinary skill in the art. The various features of the invention may be used alone or in any combination depending on the needs and preferences of the user.

What is claimed is:

1. A mobile device case for receiving a mobile device and for removably coupling to an accessory having a male portion extending therefrom, the mobile device case comprising:
    a base side; and
    a side wall extending from the base side, the base side and side wall defining a cavity to removably receive the mobile device and the side wall defining an opening opposite the base side and through which the mobile device is insertable into the cavity toward the base side such that the base side is adjacent a rear surface of the mobile device,
    wherein an inner wall defines an opening in the base side, the opening being opposite the opening defined by the side wall, and the base side includes at least one recess that opens to the cavity and that includes a stop and a second recess in the base side that opposes the at least one recess opposite the opening in the base side, each recess being defined in part by a peripheral wall, and each peripheral wall intersecting the inner wall at at least one location and at each intersection an angle of about 90° is formed between the peripheral wall and the inner wall;
    wherein the opening in the base side is configured to removably receive the male portion of the accessory in a direction toward the opening defined by the sidewall and the at least one recess is configured to rotationally receive the male portion after the male portion is inserted in the opening with the male portion residing in the recess and being between the base side and the mobile device when the mobile device is in the cavity; and
    wherein the stop is positioned to prevent 180 degrees of relative rotation between the mobile device case and the male portion.

2. The mobile device case of claim 1 wherein the stop is configured to contact the male portion in one rotational direction to couple the mobile device case and the male portion, and to uncouple the mobile device case and the male portion, rotation is reversed.

3. The mobile device case of claim 1 wherein the stop is positioned to limit relative rotation between the mobile device case and the male portion to about 90°.

4. The mobile device case of claim 1 wherein the at least one recess includes a depression configured to receive a protrusion on the male portion.

5. The mobile device case of claim 1 wherein the opening in the base side is an oval.

6. The mobile device case of claim 1 wherein at least one recess intersects the inner wall at an edge.

7. The mobile device case of claim 1 wherein the base side includes a raised region extending outwardly relative to a surrounding area of the base side, the raised region providing a planar surface that is spaced apart from the surrounding area of the base side, such that when the accessory is rotationally secured to the mobile device case, the accessory is at least partly spaced apart from the base side.

8. The mobile device case of claim 1, wherein the opening in the base side is oval, and each recess shares an edge with the inner wall.

9. The mobile device case of claim 1 wherein the inner wall is defined by opposing straight sides and opposing rounded ends.

10. The mobile device case of claim 1 wherein the opening in the base side is noncircular.

11. The mobile device case of claim 1 wherein the opening in the base side is a rectangle or rectangle with rounded corners.

12. A mobile device case assembly comprising:
    the mobile device case of claim 1; and
    the accessory having the male portion.

13. The assembly of claim 12 wherein the accessory is a wallet or a battery.

14. The assembly of claim 12 wherein the male portion has a T-shape including a post and a crossmember extending from the post.

15. The assembly of claim 14 wherein the base side includes opposing recesses that each share an edge with the inner wall and the crossmember defines opposing wings extending laterally from the post and that are configured to be received in the opposing recesses when the male portion is inserted into the opening in the base side and the accessory is rotated relative to the mobile device case.

16. The assembly of claim 11 wherein the crossmember has an oval shape.

17. The assembly of claim 11 wherein the crossmember has a periphery defined by opposing straight sides and opposing rounded ends.

18. The assembly of claim 11 wherein the post is smaller than the crossmember in at least one dimension.

19. The assembly of claim 11 wherein the crossmember has a periphery that is noncircular.

20. A mobile device case for receiving a mobile device and for removably coupling to an accessory having a male portion extending therefrom, the mobile device case comprising:
- a base side; and
- a side wall extending from the base side, the base side and side wall defining a cavity to removably receive the mobile device and the side wall defining an opening opposite the base side and through which the mobile device is insertable into the cavity toward the base side such that the base side is adjacent a rear surface of the mobile device,
- wherein an inner wall defines an opening in the base side, the opening being opposite the opening defined by the side wall, and the base side includes at least one recess that opens to the cavity and that includes a stop;
- wherein the opening in the base side is configured to removably receive the male portion of the accessory in a direction toward the opening defined by the sidewall and the at least one recess is configured to rotationally receive the male portion after the male portion is inserted in the opening with the male portion residing in the recess and being between the base side and the mobile device when the mobile device is in the cavity; and
- wherein the stop is positioned to prevent 180 degrees of relative rotation between the mobile device case and the male portion,
- wherein the base side includes a raised region extending outwardly relative to a surrounding area of the base side, the raised region providing a planar surface that is spaced apart from the surrounding area of the base side, such that when the accessory is rotationally secured to the mobile device case, the accessory is at least partly spaced apart from the base side.

* * * * *

UNITED STATES PATENT AND TRADEMARK OFFICE
CERTIFICATE OF CORRECTION

PATENT NO. : 10,742,789 B2
APPLICATION NO. : 16/117828
DATED : August 11, 2020
INVENTOR(S) : Omer Ackerman Page 1 of 1

It is certified that error appears in the above-identified patent and that said Letters Patent is hereby corrected as shown below:

In the Specification

Figure 50:
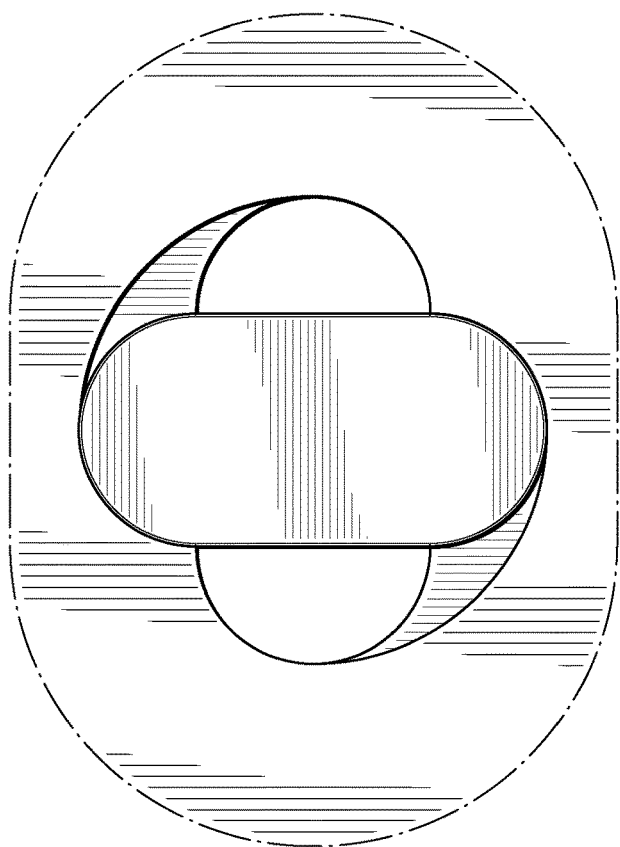
FIG. 50 is in enlarged front elevation view thereof.

Column 4, Line 12, "FIG. 50 is in enlarged front elevational" should be --FIG. 50 is an enlarged front elevational--.

Figure 51:
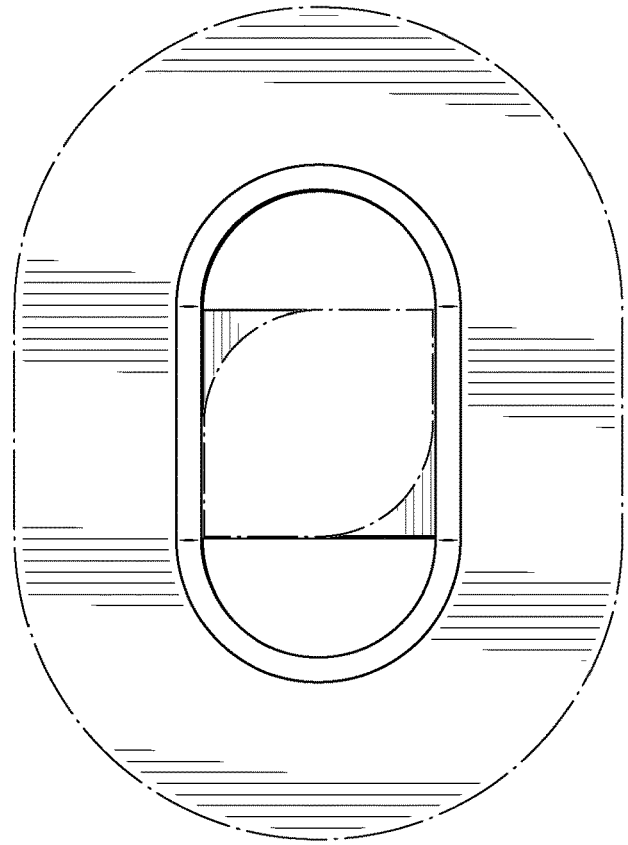
FIG. 51 is in enlarged rear elevation view thereof.
Figure 52:
FIG. 52 is a front-left perspective view of a rotational couple showing environment according to an alternative embodiment of the present invention shown in a disassembled state.

Column 4, Line 13, "FIG. 51 is in enlarged rear elevational" should be --FIG. 51 is an enlarged rear elevational--.

In the Claims

Column 10, Line 66, Claim 16, "The assembly of claim 11 wherein the crossmember" should be --The assembly of claim 14 wherein the crossmember--.

Column 11, Line 1, Claim 17, "The assembly of claim 11 wherein the crossmember" should be --The assembly of claim 14 wherein the crossmember--.

Column 11, Line 4, Claim 18, "The assembly of claim 11 wherein the post is smaller" should be --The assembly of claim 14 wherein the post is smaller--.

Column 11, Line 6, Claim 19, "The assembly of claim 11 wherein the crossmember" should be --The assembly of claim 14 wherein the crossmember--.

Signed and Sealed this
Twenty-seventh Day of October, 2020

Andrei Iancu
*Director of the United States Patent and Trademark Office*